(12) United States Patent
Wicks et al.

(10) Patent No.: US 11,318,620 B2
(45) Date of Patent: May 3, 2022

(54) METHOD AND SYSTEM FOR MANIPULATING ITEMS

(71) Applicants: INTELLIGRATED HEADQUARTERS, LLC, Mason, OH (US); CARNEGIE MELLON UNIVERSITY, Pittsburgh, PA (US)

(72) Inventors: Matthew R. Wicks, St. Charles, MO (US); Michael L. Girtman, Imperial, MO (US); Thomas M. Ferner, Lake Saint Louis, MO (US); John Simons, Saint Louis, MO (US); Herman Herman, Gibsonia, PA (US); Gabriel Goldman, Pittsburgh, PA (US); Jose Gonzalez-Mora, Pittsburgh, PA (US); Katharina Muelling, Pittsburgh, PA (US)

(73) Assignees: Intelligrated Headquarters, LLC, Mason, OH (US); Carnegie Mellon University, Pittsburgh, PA (US)

( * ) Notice: Subject to any disclaimer, the term of this patent is extended or adjusted under 35 U.S.C. 154(b) by 331 days.

(21) Appl. No.: 16/405,060

(22) Filed: May 7, 2019

(65) Prior Publication Data
US 2019/0344447 A1 Nov. 14, 2019

Related U.S. Application Data

(60) Provisional application No. 62/669,093, filed on May 9, 2018.

(51) Int. Cl.
*B25J 9/16* (2006.01)
*B25J 9/00* (2006.01)
(Continued)

(52) U.S. Cl.
CPC .......... *B25J 9/1697* (2013.01); *B25J 9/0093* (2013.01); *B25J 9/1669* (2013.01); *B25J 15/0691* (2013.01); *B25J 19/02* (2013.01)

(58) Field of Classification Search
CPC ...... B25J 9/1697; B25J 9/0093; B25J 9/1669; B25J 15/0691; B25J 19/02; B25J 13/085;
(Continued)

(56) References Cited

U.S. PATENT DOCUMENTS

| 4,390,390 A * | 6/1983 | Margraf | .................. B65C 9/36 |
| | | | 156/566 |
| 4,571,320 A | 2/1986 | Walker | |

(Continued)

FOREIGN PATENT DOCUMENTS

| CA | 2963064 C | 2/2018 |
| CN | 204954848 U | 1/2016 |

(Continued)

OTHER PUBLICATIONS

Extended European Search Report for European Application No. 19173385.6 dated Sep. 27, 2019.
(Continued)

*Primary Examiner* — B M M Hannan
(74) *Attorney, Agent, or Firm* — Alston & Bird LLP

(57) ABSTRACT

The present disclosure relates to a material handling system for manipulating items. The material handling system includes a repositioning system comprising a robotic tool which includes a robotic arm portion and an end effector. The robotic tool is configured to manipulate an item in a first orientation and reorient the item to a second orientation. The material handling system further includes a vision system having one or more sensors positioned within the material handling system. The vision system is configured to generate inputs corresponding to the characteristics of the items. The
(Continued)

material handling system may further include a controller executing instructions to cause the material handling system to identify the item in the first orientation, based on the one or more characteristics of the item, initiate, by the repositioning system, picking of the item in the first orientation, and re-orient the item in the second orientation.

16 Claims, 24 Drawing Sheets

(51) Int. Cl.
  *B25J 15/06* (2006.01)
  *B25J 19/02* (2006.01)
  *G05B 19/18* (2006.01)
  *G05B 15/00* (2006.01)

(58) Field of Classification Search
  CPC ............... B25J 15/0052; B25J 15/0061; B25J 15/0616; Y02P 90/02; G05B 19/4182; G05B 2219/39508; G05B 2219/45063
  USPC ......................................... 700/258, 259, 262
  See application file for complete search history.

(56) References Cited

U.S. PATENT DOCUMENTS

| | | | |
|---|---|---|---|
| 4,613,942 A | 9/1986 | Chen | |
| 4,634,328 A | 1/1987 | Carrell | |
| 4,741,567 A | 5/1988 | Zimmer et al. | |
| 4,897,689 A | 1/1990 | De et al. | |
| 4,987,332 A | 1/1991 | Yamamoto et al. | |
| 5,542,729 A | 8/1996 | Ohtonen | |
| 6,015,174 A | 1/2000 | Raes et al. | |
| 6,517,130 B1 | 2/2003 | Donoso et al. | |
| 6,761,527 B2 | 7/2004 | Eisenzimmer et al. | |
| 7,313,464 B1 | 12/2007 | Perreault et al. | |
| 7,648,322 B2 | 1/2010 | Moncrief et al. | |
| 8,880,216 B2 | 11/2014 | Izumi et al. | |
| 9,120,635 B2 | 9/2015 | Su | |
| 9,492,923 B2 | 11/2016 | Wellman et al. | |
| 9,492,926 B2 | 11/2016 | Mattern et al. | |
| 9,498,887 B1 | 11/2016 | Zevenbergen et al. | |
| 9,707,682 B1 | 7/2017 | Konolige et al. | |
| 9,802,728 B1* | 10/2017 | Rodgers ................. B65C 1/021 | |
| 9,926,138 B1* | 3/2018 | Brazeau ............... B65G 1/1376 | |
| 9,981,382 B1* | 5/2018 | Strauss ................. B25J 9/1666 | |
| 2004/0165980 A1 | 8/2004 | Huang et al. | |
| 2005/0072656 A1 | 4/2005 | Costanzo | |
| 2005/0115421 A1 | 6/2005 | Lyons | |
| 2005/0196484 A1 | 9/2005 | Khoshnevis | |
| 2005/0281662 A1 | 12/2005 | Carey et al. | |
| 2009/0028676 A1 | 1/2009 | Langlot et al. | |
| 2009/0200139 A1 | 8/2009 | Kissee et al. | |
| 2009/0218193 A1 | 9/2009 | Malini | |
| 2010/0078953 A1 | 4/2010 | Ban et al. | |
| 2010/0170201 A1 | 7/2010 | Aquarius | |
| 2010/0199915 A1 | 8/2010 | Pettersson et al. | |
| 2010/0239408 A1 | 9/2010 | Becker et al. | |
| 2012/0205928 A1 | 8/2012 | La et al. | |
| 2014/0052555 A1* | 2/2014 | MacIntosh ......... G06K 9/00664 | |
| | | | 705/23 |
| 2014/0126988 A1 | 5/2014 | Qi et al. | |
| 2015/0344225 A1 | 12/2015 | Nakamura et al. | |
| 2016/0139438 A1 | 5/2016 | Jing et al. | |
| 2016/0196997 A1* | 7/2016 | White ....................... F27B 1/08 | |
| | | | 361/234 |
| 2016/0243590 A1 | 8/2016 | Crest et al. | |
| 2016/0282126 A1* | 9/2016 | Watts ..................... H04W 4/029 | |
| 2017/0035017 A1 | 2/2017 | Hofman et al. | |
| 2017/0062263 A1 | 3/2017 | Besil et al. | |
| 2017/0066592 A1* | 3/2017 | Bastian, II ............. B25J 9/0096 | |
| 2017/0165717 A1 | 6/2017 | Crest et al. | |
| 2017/0173789 A1 | 6/2017 | Kilibarda et al. | |
| 2017/0203443 A1 | 7/2017 | Lessing et al. | |
| 2017/0225330 A1* | 8/2017 | Wagner .................. B25J 9/0093 | |
| 2017/0349385 A1 | 12/2017 | Moroni et al. | |
| 2017/0369244 A1 | 12/2017 | Battles et al. | |
| 2018/0022557 A1 | 1/2018 | Tanaka et al. | |
| 2018/0053144 A1 | 2/2018 | Wellman | |
| 2018/0264660 A1 | 9/2018 | Bergeron et al. | |
| 2019/0061174 A1 | 2/2019 | Robinson et al. | |
| 2019/0070734 A1 | 3/2019 | Wertenberger et al. | |
| 2019/0185267 A1* | 6/2019 | Mattern ................. B25J 9/1679 | |
| 2019/0228371 A1 | 7/2019 | Murphy et al. | |
| 2019/0277868 A1* | 9/2019 | Privat De Fortune ...................... | |
| | | | G01N 35/00732 |
| 2021/0237219 A1* | 8/2021 | Baker .................... B23Q 1/621 | |
| 2021/0308875 A1 | 10/2021 | Gealy et al. | |
| 2022/0024056 A1 | 1/2022 | Yap et al. | |
| 2022/0024705 A1 | 1/2022 | Geyer et al. | |

FOREIGN PATENT DOCUMENTS

| | | |
|---|---|---|
| CN | 107444909 A | 12/2017 |
| CN | 107745963 A | 3/2018 |
| CN | 207273223 U | 4/2018 |
| DE | 2357118 A | 5/1975 |
| DE | 102007054867 A1 | 5/2009 |
| DE | 102012009649 A1 | 11/2013 |
| EP | 1066587 B1 | 11/2007 |
| EP | 2329925 A1 | 6/2011 |
| JP | 2000-006074 A | 1/2000 |
| JP | 2010-188465 A | 9/2010 |
| JP | 2010-278408 A | 12/2010 |
| JP | 2015-153837 A | 8/2015 |
| JP | 2016-145115 A | 8/2016 |
| JP | 2017-124469 A | 7/2017 |
| JP | 2017-170560 A | 9/2017 |
| WO | 2010/109923 A1 | 9/2010 |
| WO | 2012/144120 A1 | 10/2012 |
| WO | 2014/111633 A1 | 7/2014 |
| WO | 2016/054561 A1 | 4/2016 |

OTHER PUBLICATIONS

Office Action for European Application No. 19173385.6 dated Nov. 18, 2019.
Vacuum Suctions Cups, Vacuforce LLC, [online], [retrieved Aug. 6, 2019], retrieved from the Internet <URL: http://www.vacuforce.com/products.html> (2 pages).
Extended European Search Report for Application No. 19173383.1, dated Sep. 16, 2019, 10 pages.
Partial European Search Report for Application No. 19173384.9, dated Oct. 17, 2019, 15 pages.
Non-Final Rejection dated Mar. 20, 2020 for U.S. Appl. No. 16/405,041.
Notice of Allowance and Fees Due (PTOL-85) dated Jul. 1, 2020 for U.S. Appl. No. 16/405,041.
Comminication pursuant to Rules 70(2) and 70a(2), for European Application No. 19173384.9, dated Mar. 30, 2020.
Extended European Search Report for Application No. 19173384.9, dated Feb. 21, 2020, 20 pages.
Non-Final Office Action received for U.S. Appl. No. 16/405,074, dated Aug. 18, 2021, 29 pages.
Communication Pursuant to Article 94(3) issued in European Application No. 19173384.9 dated Sep. 24, 2021, 10 pages.
Examiner Interview Summary Record (PTOL—413) dated Feb. 24, 2022 for U.S. Appl. No. 16/405,074, 1 page.
Notice of Allowance and Fees Due (PTOL-85) dated Feb. 24, 2022 for U.S. Appl. No. 16/405,074, 12 pages.

* cited by examiner

METHOD AND SYSTEM FOR MANIPULATING ITEMS

CROSS-REFERENCE TO RELATED APPLICATIONS

This application claims the benefit of U.S. Provisional Patent Application No. 62/669,093, entitled "Method and System for Reorienting Articles," filed on May 9, 2018, the disclosure of which is hereby incorporated by reference in its entirety.

TECHNOLOGICAL FIELD

Example embodiments of the present invention relate generally to a material handling system for manipulating items, and, more particularly, to a subsystem of the material handling system for manipulating the orientation of the items.

BACKGROUND

Material handling systems can convey, sort, and organize items (e.g. cartons, cases, containers, shipment boxes, totes, packages, and/or the like) at high speeds. Depending on a configuration of the material handling system, the items may travel through the material handling systems in an unregulated manner or may be repositioned, reoriented, and/or consolidated into a single stream of items on conveyors and/or other locations. Material handling systems may rely on a conveyor controller and/or warehouse management system to organize items being conveyed and/or handled.

Generally, a material handling system may be required to handle items of different physical characteristics, for example, item type, item body shape, etc. For instance, in some cases, the material handling system handles items having a rigid body shape (e.g., totes, containers, cartons, heavy shipment boxes, and/or the like) or a flexible body shape (e.g. packages, polybags, envelopes, and/or the like). These items may need to be repositioned and/or reoriented through various stages of handling and processing by the material handling system. Typically, the material handling system include equipment adapted to handle the items depending on the physical characteristics. For instance, robotic tools are installed or deployed at various locations within the material handling environment, for picking the items and further manipulating these items (i.e. re-orienting and/or re-positioning the items).

Applicant has identified several technical challenges associated with handling items in a material handling system and other associated systems and methods. Through applied effort, ingenuity, and innovation, many of these identified challenges have been overcome by developing solutions that are included in embodiments of the present invention, many examples of which are described in detail herein.

BRIEF SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relates to, a material handling system for manipulating items. The material handling system includes a repositioning system comprising a robotic tool. The robotic tool includes a robotic arm portion and an end effector coupled to the robotic arm portion. The robotic tool is configured to manipulate an item in a first orientation and reorient the item to a second orientation. The material handling system further includes a vision system comprising one or more sensors positioned within the material handling system. The vision system is configured to generate inputs corresponding to one or more characteristics of the item. The material handling system further includes a controller communicatively coupled to the repositioning system and the vision system. The controller includes at least one processor configured to execute instructions to the material handling system to: identify by the vision system, the item in the first orientation; based on the one or more characteristics of the item generated by the vision system, initiate, by the repositioning system, picking of the item in the first orientation, and upon picking the item in the first orientation, reorient, by the repositioning system, the item to the second orientation.

In some example embodiments, the end effector of the robotic tool may include a flipper table adapted to flip the item from the first orientation to the second orientation. In some example embodiments, the end effector may include a vacuum gripper rotatably engaged to the robotic arm, where the vacuum gripper comprises at least one flexible suction cup and at least one rigid gripper cup adapted to grip the item and rotate about an axis to manipulate the item from the first orientation to the second orientation.

According to some example embodiments, the material handling system includes an identification system for scanning an identifier associated with the item. In this regard, the repositioning system is configured to reorient the item to a label up position in which a label comprising the identifier is positioned on a top face of the item for scanning by the identification system.

In some example embodiments, the controller is further configured to: determine if in the first orientation of the item, a top surface of the item includes at a label; in response to determining that the top surface of the item includes the label, transfer the item to the conveyor in the first orientation, and in response to determining that the top surface of the item does not include the label, initiate, via the repositioning system, reorientation of the item to the second orientation. In this aspect, in the second orientation the top surface of the item includes the label.

According to some example embodiments, the controller of the material handling system is further configured to access from the vision system at least one of: a plurality of images captured by at least a camera of the vision system, where the plurality of images includes the item or sensor data collected from the one or more sensors of the vision system. Further the controller is configured to process, via the vision system, either the plurality of image of the sensor data to generate the one or more characteristics of the item. In this aspect, the characteristics of the item may include one or more of a: a shape of the item, a weight of the item, an edge of the item, a label on the item, or a category of the item. The controller is further configured to classify the item based on the one or more characteristics of the item. Further, the controller is configured to, select an item handling procedure indicative of a configuration of the repositioning system based on which the repositioning system manipulates the item. In this regard, the controller selects the item handling procedure based on the classification of the item.

In some example embodiments, the robotic tool further comprises one or more sensors, wherein the one or more sensors include at least one of a force sensor, a torque sensor, or a distance sensor.

In some example embodiments, the repositioning system is configured to receive the item from a chute or a conveyor in the first orientation, wherein the chute or the conveyor is configured to receive the item from an upstream conveyor of the material handling system.

In some example embodiments, where the item is positioned in the first orientation on a conveyor. In this aspect, the conveyor is a section of the material handling system positioned downstream from the repositioning system; or an induction conveyor for a sortation system of the material handling system.

In some example embodiments, the end effector of the repositioning system is an orientation table comprising at least two conveyor strip belts. In this regard, each of the at least two conveyor strip belts are independently controlled to rotate the item placed on the orientation table in the first orientation to the second orientation. Further, in some example embodiments, the orientation table is communicably coupled to a conveyor such that the item is reoriented and transferred from the orientation table to the conveyor. In some example embodiments, each of the at least two conveyor strop belts of the orientation table are controlled to operate at different speeds and directions. In some example embodiments, the orientation table includes a wide belt and a narrow belt, where the repositioning system is configured to place smaller items on the wide belt for conveying to a downstream conveyor. In accordance with some example embodiments, the end effector of the robotic tool includes a pinch gripper. The pinch gripper includes: a mount attached to the robotic arm portion of the robotic tool, at least two plates; and one or more suction cups attached to at least a bottom surface of the at least two plates. In this regard, the at least two plates are attached to the mount such that a proximal end of each of the at least two plates are pivotally attached to the mount at a pivot point, and a distal end of each of the at least two plates is capable of rotating freely about the pivot point. In some example embodiments, the pinch gripper comprises at least a first plate and a second plate. In this regard, the pinch gripper is configured to: pick the item by grasping a first edge of the item with a first set of suction cups of the first plate, rotate the first plate about the pivot point towards the second plate, such that a second edge of the item is grasped by a second set of suction cups of the second plate; and release the first edge of the item from the first plate. In some example embodiments, the pinch gripper is further configured to: rotate the second plate towards the first plate to grasp the second edge of the item, rotate the second plate about the pivot point to place at least one of the first edge or a third edge of the item on the conveyor, and release the second edge of the item from the second plate.

According to some example embodiments, a method of manipulating items in a material handling system is described. The method includes, accessing, from a vision system comprising one or more sensors, at least one of: a plurality of images comprising an item or sensor data sensed by the one or more sensors. The method further includes, processing, via the vision system, either the plurality of images of the sensor data to generate one or more characteristics of the item and a first orientation of the item. In this aspect, the one or more characteristics comprises one or more of: a shape of the item, a weight of the item, an edge of the item, a label on the item, a marker on the item, or a category of the item. The method further includes, selecting based on the identified one or more characteristics and the first orientation of the item, an item handling procedure indicative of a configuration of a repositioning system comprising a robotic tool, based on which the repositioning system manipulates the item. Further, the method includes, based on the selected item handling procedure, picking by the repositioning system, the item in the first orientation. Further, the method includes, reorienting, by the repositioning system, the item in a second orientation.

According to some example embodiments, the method for manipulating the items includes, detecting, by the vision system, an identifier associated with the item. The method further includes, reorienting, by the repositioning system, the item from the first orientation to a label up orientation. In this regard, in the label up orientation, a label comprising the identifier associated with the item is positioned on a top face of the item for scanning by an identification system.

In some example embodiments, the method further includes, determining the first orientation of the item to be conveyed on a conveyor and determining if in the first orientation of the item, a top surface of the item includes a label. In this aspect, in response to determining the top surface of the item includes the label, the method includes, transferring the item to the conveyor in the first orientation. However, in response to determining that the top surface of the item does not includes the label, the method includes, initiating, via the repositioning system, reorientation of the item in the second orientation, wherein in the second orientation the top surface of the item includes the label.

In accordance with some example embodiments, the method of manipulating the item comprises, positioning the item in the first orientation on a flipper table of the repositioning system. Further, the method includes, engaging the item on the flipper table, based on a vacuum force generated through a plurality of suction cups of the flipper table. Upon engaging the item, the method includes, flipping the flipper table to reorient the item to the second orientation.

In accordance with some example embodiments described herein, the reorienting of the item in the second orientation comprises, picking, the item in the first orientation, by an end effector of the repositioning system, wherein the end effector comprises at least one flexible suction cup and at least one rigid gripper. The method further includes, moving, a robotic arm rotatably engaged to the end effector, to reorient the item gripped by at least one of the at least one flexible suction cup and the at least one rigid gripper of the end effector in the second orientation. Further, upon moving the robotic arm, the method includes, placing the item in the second orientation.

The illustrative embodiments of the present disclosure relate to methods and systems for handling both rigid and flexible items. According to at least one aspect of the present disclosure, a material handling system is provided. The material handling system may include a repositioning system having at least one of a robotic tool, a flipper unit, and an orientation table. The robotic tool may include a robotic arm portion, and an end effector, coupled to the robotic arm portion, such that the robotic tool may pick one or more items in a first orientation and reorient the one or more items to a second orientation for placement onto a conveyor. The flipper unit may receive an item in a first orientation and flip to place the item onto the conveyor in a second orientation. The orientation table may include at least two conveyor strip belts, such that each of the at least two conveyor strip belts may be independently controlled to rotate an item placed on the orientation table in a first orientation to a second orientation. The material handling system may further include a vision system, having one or more sensors positioned at one or more predetermined locations within the material handling system. The vision system may generate inputs corresponding to one or more characteristics of the items. The material handling system may further include a controller in communication with the repositioning system and the vision system, such that the controller may have at least one processor that executes instructions to cause the material handling system to perform operations such as: determining, by the vision system, a first orientation of an item to be conveyed on the conveyor; receiving, by the repositioning system, the item in the first orientation; and reorienting, by the repositioning system, the item in a second orientation for placement onto the conveyor.

According to one or more embodiments of the present disclosure, the repositioning system may include at least one of the robotic tool, the flipper unit, the orientable table, or a combination thereof.

According to one or more embodiments of the present disclosure, the repositioning system may receive the one or more items from one of a chute and a conveyor in a first orientation. Further, the one of the chute and the conveyor may receive the one or more items from an upstream conveyor of the material handling system.

According to one or more embodiments of the present disclosure, the conveyor may be a section of the material handling system positioned downstream from the repositioning system.

According to one or more embodiments of the present disclosure, the conveyor may be an induction conveyor for a sortation system of the material handling system.

According to one or more embodiments of the present disclosure, the orientation table may be a part of or connected to the conveyor such that the one or more items may be reoriented and transferred from the orientation table to the conveyor.

According to one or more embodiments of the present disclosure, each of the at least two conveyor strip belts of the orientation table may be controlled to operate at different speeds and direction.

According to one or more embodiments of the present disclosure, the orientation table may include a wide belt and a narrow belt, such that the repositioning system may place smaller items on the wide belt for conveying to a downstream conveyor.

According to one or more embodiments of the present disclosure, the material handling system may further include an identification system for scanning an identifier associated with the one or more items. Further, the identification system may be a barcode scanning system, and the identifier may be a barcode.

According to one or more embodiments of the present disclosure, the repositioning system may reorient the one or more items to a label-up position such that a label having an identifier associated with the one or more items may be positioned on the top face of the one or more items for scanning.

According to one or more embodiments of the present disclosure, the controller may determine a first orientation of an item to be conveyed on the conveyor. The controller may further determine if the top surface of the item includes at least one of a label, marker, or barcode in the first orientation of the item. In response to determining that the top surface of the item includes the at least one of a label, marker, or barcode, the controller may transfer the item to the conveyor in the first orientation.

According to one or more embodiments of the present disclosure, the end effector of the robotic tool may include a vacuum gripper. The vacuum gripper may include one or more flexible suction cups and a rigid gripper. Further, each of the one or more flexible suction cups and the one or more rigid gripper may have an ejector. The ejector may employ compressed air fed into the flexible suction cups and the one or more rigid gripper.

According to one or more embodiments of the present disclosure, the end effector of the robotic tool may include a pinch gripper. The pinch gripper may include: a mount attached to the robotic arm portion of the robotic tool; and at least two plates attached to mount such that a proximal end of each of the at least two plates pivotally attached to the mount at a pivot point, and a distal end of each of the at least two plates is capable to rotating freely about the pivot point.

According to one or more embodiments of the present disclosure, the at least two plates may further include one or more suction cups attached to at least a bottom surface of the at least two plates.

According to one or more embodiments of the present disclosure, the pinch gripper may have at least a first plate and a second plate. The pinch gripper may pick an item by grasping a first edge of the item with a first set of suction cups of the first plate, rotate the first plate about the pivot point towards the second plate, such that a second edge of the item is grasped by a second set of suction cups of the second plate, and release the first edge of the item from the first plate.

According to one or more embodiments of the present disclosure, the pinch gripper may further rotate the second plate towards the first plate to grasp the second edge of the item, rotate the second plate about the pivot point to place at least one of the first edge or a third edge of the item on the conveyor, and release the second edge of the item from the second plate.

According to one or more embodiments of the present disclosure, the robotic tool may further include one or more sensors, such that the one or more sensors may include at least one of a force sensor, a torque sensor, and a distance sensor.

According to one or more embodiments of the present disclosure, the end effector may further have a roller gripper having at least two rollers disposed adjacent to each other, such that each of the two rollers rotate in opposite direction to pinch and hold at least a portion of the item between the two rollers, further wherein each of the two rollers rotate in same direction to release the portion of the item held between the two rollers.

According to one or more embodiments of the present disclosure, the flipper unit may include a flipper mesh having a receiving platform such that one end of the receiving platform is pivotally attached to a shaft coupled to the conveyor and the other end of the receiving platform may pivot to one or more positions between 0 and 360 degrees. The flipper unit may receive an item on the receiving platform in a first orientation and flip the receiving platform to place the item onto the conveyor in a second orientation.

According to one or more embodiments of the present disclosure, the receiving platform may include a plurality of elongated fingers positioned parallel to each other. The one end of each of the plurality of elongated fingers may be attached to the shaft and the other end of each of the plurality of elongated fingers may be rotatable about the shaft to one or more positions between 0 and 360 degrees.

According to one or more embodiments of the present disclosure, the conveyor may include a plurality of strip belts, such that the plurality of elongated fingers may rest between the plurality of strip belts below a surface of the conveyor such that the conveyor may receive the item.

According to one or more embodiments of the present disclosure, the shaft may be coupled to the conveyor through a pivotable connector, such that the pivotable connector may pivot downwards towards the conveyor to position the flipper mesh at a first height, and the pivotable connector may pivot upwards away from the conveyor to position the flipper mesh at a second height, such that the second height is greater than the first height.

According to one or more embodiments of the present disclosure, the flipper unit may include at least two posts, a second robot arm portion mounted between the posts, such that the second robot arm portion is capable of moving upwards and downwards along the posts, and outwards and inwards from the posts in a horizontal direction, and a flipper table pivotally connected to a distal end of the second robot arm portion through an end shaft, such that the flipper table may receive an item in a first orientation and flip to place the item onto the conveyor in a second orientation.

According to one or more embodiments of the present disclosure, the flipper table may include a top plate and a bottom plate connected through a central frame, such that the central frame is connected to the end shaft, and one or more suction cups disposed on the top plate and the bottom plate for holding the item. The flipper unit may further include one or more adjustable height supports disposed on the flipper table for supporting the item being flipped by the flipper unit, and a drive motor communicatively coupled to the end shaft for rotating the end shaft.

According to one or more embodiments of the present disclosure, the flipper table may be rotatable about the end shaft in a stowing position, such that the top plate and the bottom plate of the flipper table may be positioned proximal and parallel to the posts in the stowing position.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
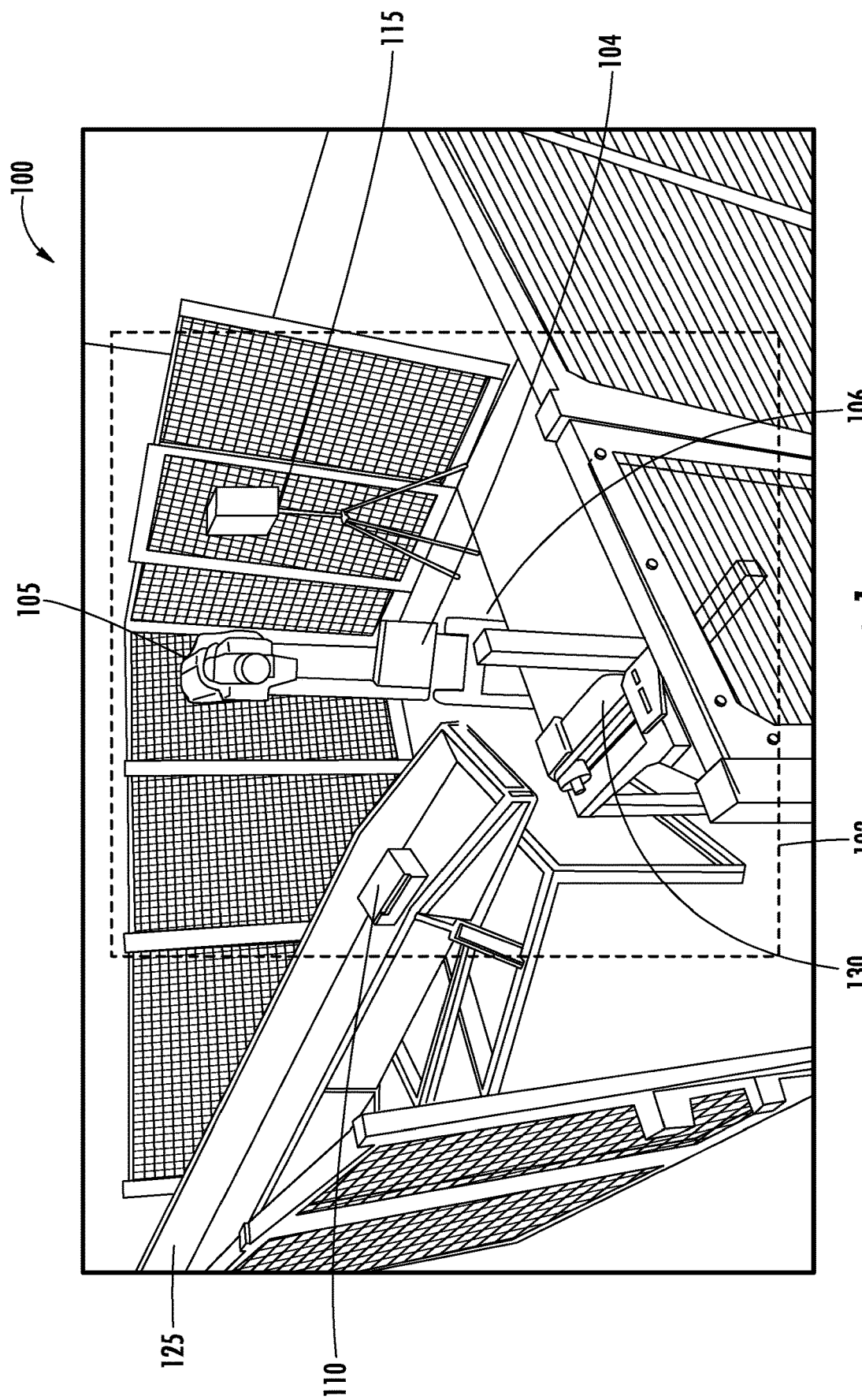
FIG. 1 illustrates a perspective view of a material handling system, in accordance with an embodiment of the present disclosure.

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

Typically, in a material handling environment having items with variable physical characteristics (e.g., length of the item, width of the item, height of the item, weight of the item, center of gravity of the item, body shape of the item, material strength of the item, and/or the like) the items are to be handled carefully by equipment, with a reliability so as to avoid any physical damage at a time of handling. Also, these items are handled by the equipment, such as, robotic tools and/or conveyors, at high speeds within the material handling environment. Accordingly, the robotic tools and/or other equipment within the material handling environment are required to operate at high speeds while still maintaining the reliability of handling the items and avoiding any mishandling which may cause a physical damage to the item during its manipulation.

Various example embodiments described herein relate to a material handling system for manipulating items. Manipulating these items may be referred to hereinafter throughout the description as picking the items, gripping the items, re-positioning the items, retrieving the items, lifting the items, moving of the items, and/or reorienting the items from a first orientation to the second orientation, by equipment of the material handling system. In accordance with said example embodiments, the material handling system includes a repositioning system comprising a robotic tool. The robotic tool includes a robotic arm portion and an end effector coupled to the robotic arm portion. The robotic tool is configured to manipulate an item in a first orientation and reorient the item to a second orientation. According to various example embodiments described herein, different configurations of the end effector can be used in the repositioning system for manipulating the items.

For example, the end effector of the repositioning system may be a flipper table having one or more suction cups configured to engage an item. The flipper table mentioned herein, is adapted to rotate about its axis to flip the item engaged to the flipper table from the first orientation to the second orientation. In another example embodiment, the end effector can be a pinch gripper having two plates with one or more suctions cups disposed on the at least two plates. The two plates are pivotably engaged to each other and are configured to rotatably move relative to each other to manipulate the item. In another example embodiment, the end effector can be a vacuum gripper having one or more flexible suction cups and at least one rigid gripper for handling items of rigid or flexible body shapes. Other configurations of the end effector are also possible as illustrated and described hereafter.

According to said example embodiments, the material handling system also includes, a vision system having one or more sensors positioned within the material handling system. The vision system is configured to generate inputs corresponding to one or more characteristics of the item. Some example characteristics of items that may be generated by the vision system may include a size of the item, position of the item, body shape of the item, orientation of the item, edges or markings on the item, presence of marker or a label on the item, and/or positioning of a label on the item.

The material handling system also includes a controller. The controller is communicatively coupled to the repositioning system, the vision system, and/or other subsystems of the material handling system. The controller includes at least one processor configured to execute instructions to cause the material handling system to at least: identify by the vision system, the item in the first orientation, based on the one or more characteristics of the item generated by the vision system, initiate, by the repositioning system, picking of the item in the first orientation, and upon picking the item in the first orientation, reorient, by the repositioning system, the item to the second orientation.

Having described example embodiments related to the present disclosure at a high level, the design of the various devices performing various example operations is provided below.

Figure 2:
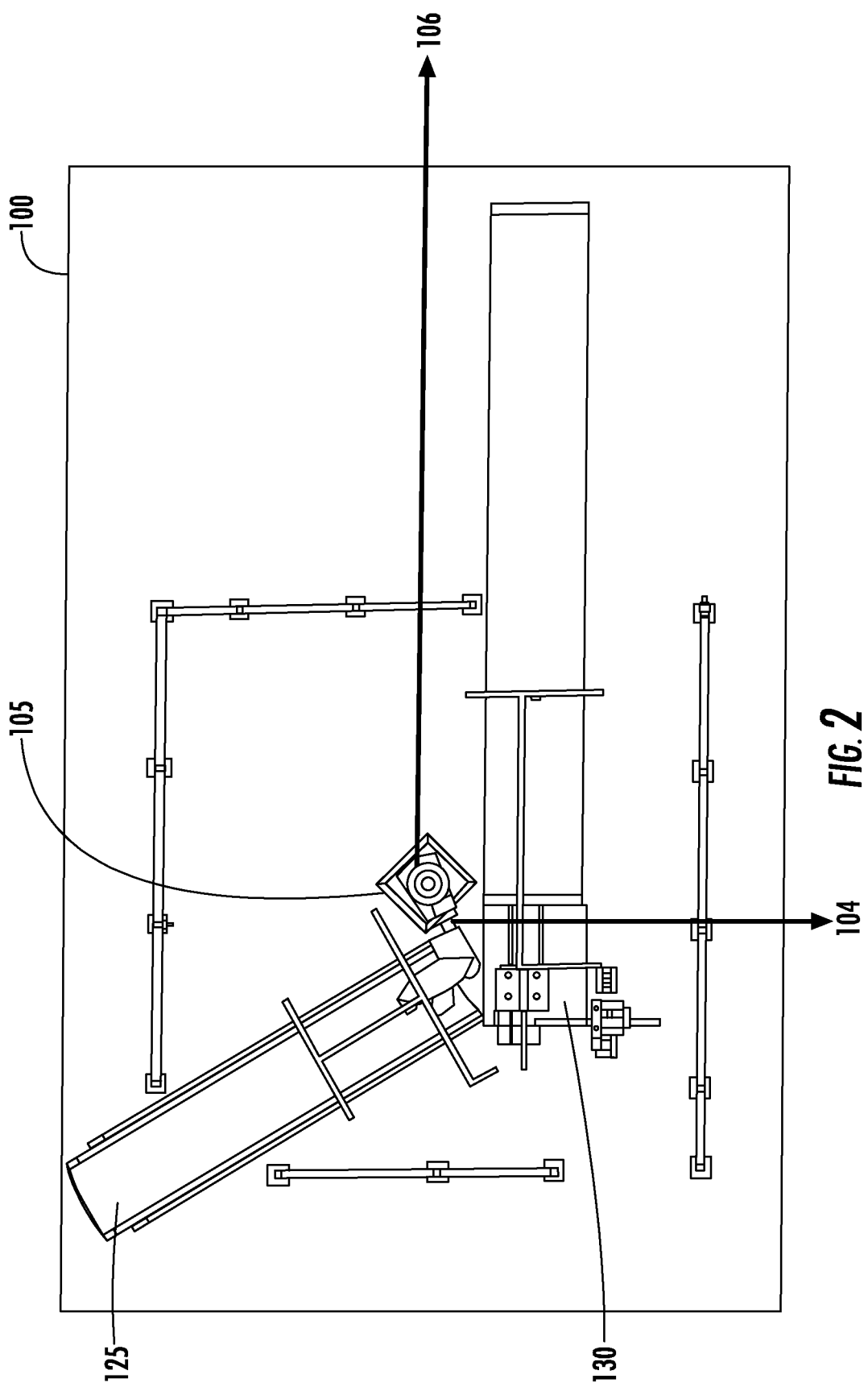
FIG. 2 illustrates a top view of the material handling system of FIG. 1, in accordance with an embodiment of the present disclosure.

FIG. 1 and FIG. 2 illustrate a perspective view and a top view, respectively, of a material handling system 100, in accordance with one or more embodiments of the present disclosure. The material handling system 100 may handle different types of items having varying physical characteristics. For example, the material handling system 100 can handle items (e.g., totes, containers, articles, shipment packages, boxes, envelops, paper bags, parcels, polybags, and/or the like) without limitation. The material handling system 100 may include a variety of components and/or subsystems, such as an induction conveyor, sortation system, chutes, identification systems, vision systems, robotic subsystems, and/or the like, for handling and processing items.

According to various example embodiments described herein, the material handling system 100 is configured to manipulate an item 110 from a first orientation to a second orientation. In this regard, according to some example embodiments, a repositioning system 105 of the material handling system 100 is configured to receive the item 110 in a first orientation from a chute 125 and/or a conveyor (not shown). The repositioning system 105 may further reorient the item 110 from the first orientation to a second orientation for placement onto a conveyor 130 and/or any downstream subsystem of the material handling system 100.

As shown, the material handling system 100 also includes a vision system 115 comprising include one or more sensors such as cameras, photo detectors, proximity sensors, infrared sensors, and/or the like. The one or more sensors of the vision system 115 may be positioned at various locations within the material handling system 100. In some example embodiments, the one or more sensors of the vision system 115 are configured to generate inputs corresponding to one or more characteristics of the item 110. It should be noted that the vision system 115 is shown as a standalone camera in FIG. 1; however, the vision system 115 is not limited to the implementation shown in FIG. 1. The vision system 115 may include a network of imagers, sensors, cameras, identification systems, and/or the like, for determining characteristics of one or more items conveyed in the material handling system 100. The characteristics of the item 110 may be utilized by one or more subsystems in the material handling environment such as, but not limited to, the repositioning system 105, the vision system 115, and/or other equipment within the material handling system 100.

The material handling system 100 may further include, a control system (not shown) including a controller which may be communicably coupled with the repositioning system 105, the vision system 115, and/or other subsystems of the material handling system 100. In accordance with some example embodiments, the controller may include at least one processor that may execute instructions to cause the material handling system 100 to perform specific operations. In accordance with the embodiments of the present disclosure, the processor may execute instructions to cause the vision system to determine a first orientation of the item 110 to be conveyed. The processor may further execute instructions to cause the repositioning system 105 to receive the item 110 in the first orientation. Further, the processor may execute instructions to cause the repositioning system 105 to reorient the item 110 to a second orientation for placement onto a conveyor 130, such as a downstream conveyor within the material handling system 100. In this regard, the repositioning system 105 may include a robotic end effector for manipulating the item 110 including reorienting and repositioning of the item 110. Details related to the end effector of the repositioning system 105 and its associated operations, are described later in reference to FIGS. 3-18.

In accordance with an embodiment of the present disclosure, the item 110, such as a parcel, may have a label placed thereon. As described herein, a label may also refer to a marker, imprinted information, encoded information marked on a surface, and/or the like. In some example embodiments, a label may correspond to a printed medium including an identifier which includes coded information, such as a barcode, QR code, 2D-code, 3D-code, Direct part marking (DPM) code, and/or the like. The label may include information corresponding to the item, such as, but not limited to, identifier for uniquely identifying a product within the item, a type of the item, a type of the product, a size of the product, product manufacturer's information, weight of the item, delivery address of the item, and/or the like.

According to some example embodiments, information corresponding to the item 110 may be coded in an identifier, such as a barcode or a QR code, on the label associated with the item 110. Accordingly, for handling and processing the item 110, one or more subsystems of the material handling system 100 may scan the identifier on the label of the item 110 at different stages of conveyance. During conveyance, an orientation of the item 110 may change frequently. In some cases, the item 110 may be orientated such that the label may not be positioned in view of a label identification system. The label identification system may correspond to a scanner configured to scan an identifier on the label. For example, the label identification may correspond to a barcode scanner, optical reader, an RFID reader, a bi-optic scanner, and/or the like configured for scanning an identifier associated with the label.

As described above, the repositioning system 105 may reorient the item 110 in a label-up position such that an identifier and/or the label associated with the item 110 may be positioned on a top face of the item 110 for scanning. According to some example embodiments, the controller may determine an orientation of the item. For instance, the controller may determine, via the vision system 115, a first orientation of the item 110 in which a top surface of the item 110 includes the label. In this case, in response to determining that the top surface of the item 110 includes the label, the controller may instruct the repositioning system 105 and/or any other subsystem of the material handling system 100 to transfer the item 110 to the conveyor 130 in the first orientation, that is, without reorienting the item 110. Alternatively, the controller may determine, via the vision system 115, another orientation of the item 110 in which the top surface of the item 110 does not includes the label. In this regard, the controller may instruct the repositioning system 105 and/or any other subsystem of the material handling system 100 to transfer the item 110 to the conveyor 130 in a second orientation different from the first orientation. In the second orientation, the label of the item would be positioned on the top surface of the item, such that, the identifier on the label is exposed in a field of view of the identification system, thereby facilitating scanning of the identifier.

In accordance with one or more embodiments of the present disclosure, the repositioning system 105 may include a robotic tool having a robotic arm and an end effector. The repositioning system 105 is configured to have different configurations of the end effector customized for manipulating items based on its one or more characteristics (e.g., body shape, type of the item, surface material of the item, and/or the like). For instance, in some example embodiments, the end effector of the repositioning system 105 may include a flipper unit, an orientation table, a vacuum gripper, and/or any combination thereof, for manipulating the item 110. Different configurations of the end effectors of the repositioning system 105 are described hereinafter.

FIGS. 3a to 3e illustrate different views of a robotic tool 300 of the repositioning system 105 of the material handling system 100, as shown in FIG. 1 and FIG. 2, in accordance with an example embodiment. As shown, the robotic tool 300 may include a robotic arm portion 305 of a robotic arm (e.g., robotic arm 1235 illustrated in FIGS. 12a-12d) and an end effector 310 defined at an end thereof. The robotic arm may be any suitable robotic arm configured to provide sufficient degree of motion for picking, placing, repositioning, etc. an item and/or a group of items. According to some example embodiments, the robotic arm portion 305 is communicatively coupled to the control system that can control operations such as the movement, positioning, starting, and stopping, of the robotic arm portion 305. The control system of the item manipulation system 102 may initiate movement of the robotic arm portion 305 so as to position the end effector 310 to any of a picking position, gripping position, retrieval position, and a discharging position of the item 110, details of which are described hereafter.

In some alternate example embodiments, the robotic tool 300 including the robotic arm portion 305 and the end effector 310 may be controlled by a controller remotely positioned and/or any other subsystem of the material handling system 100 to pick the item 110 in a first orientation and reorient the item 110 to a second orientation for placement onto the conveyor 130.

Figure 3A:
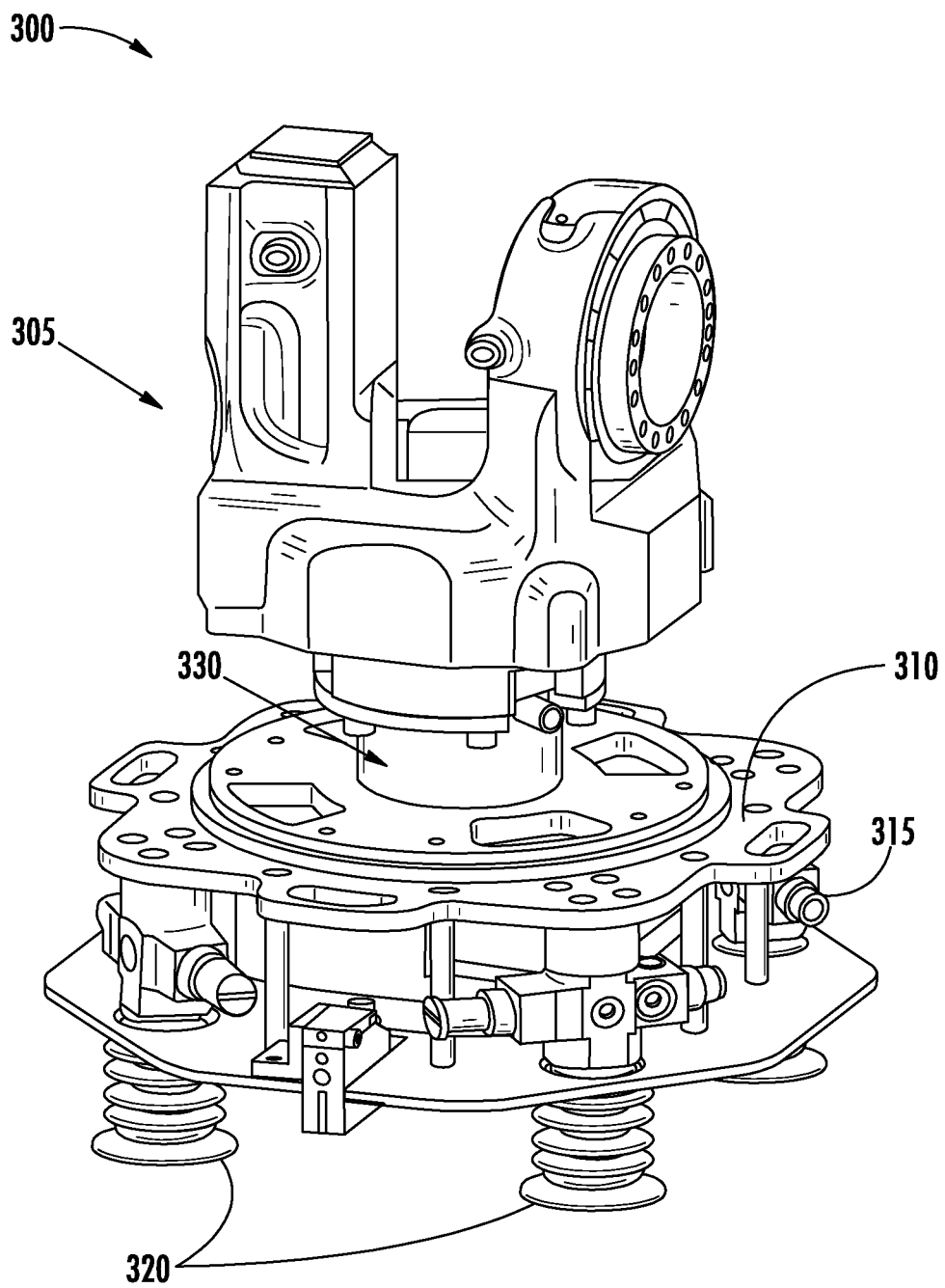
FIGS. 3a-3e illustrate different views of a robotic tool, in accordance with one or more embodiments of the present disclosure.
Figure 3B:
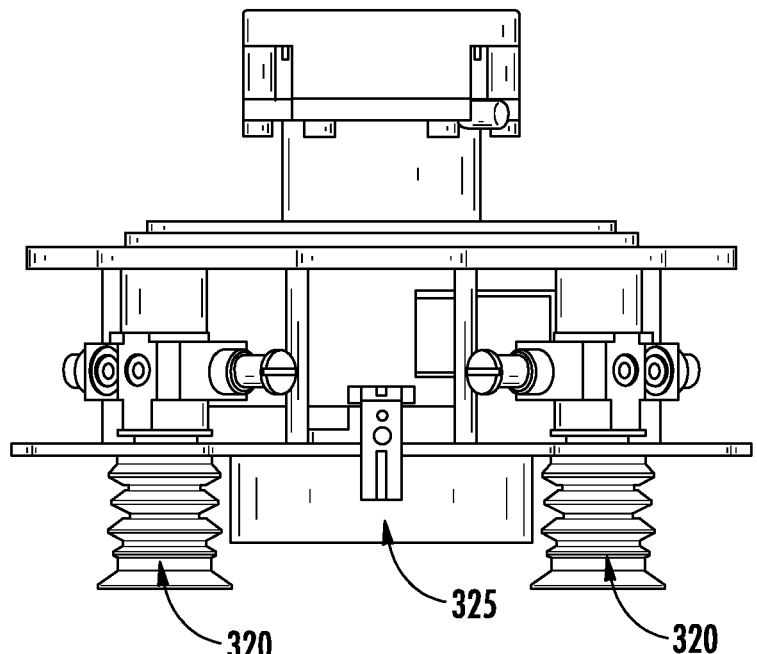
Figure 3C:
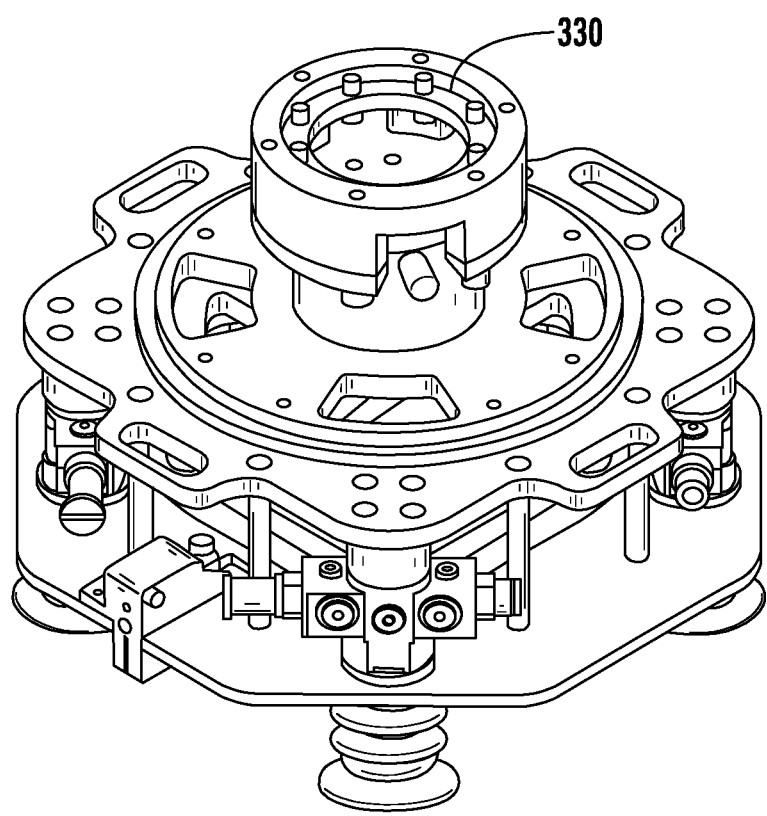
Figure 3D:
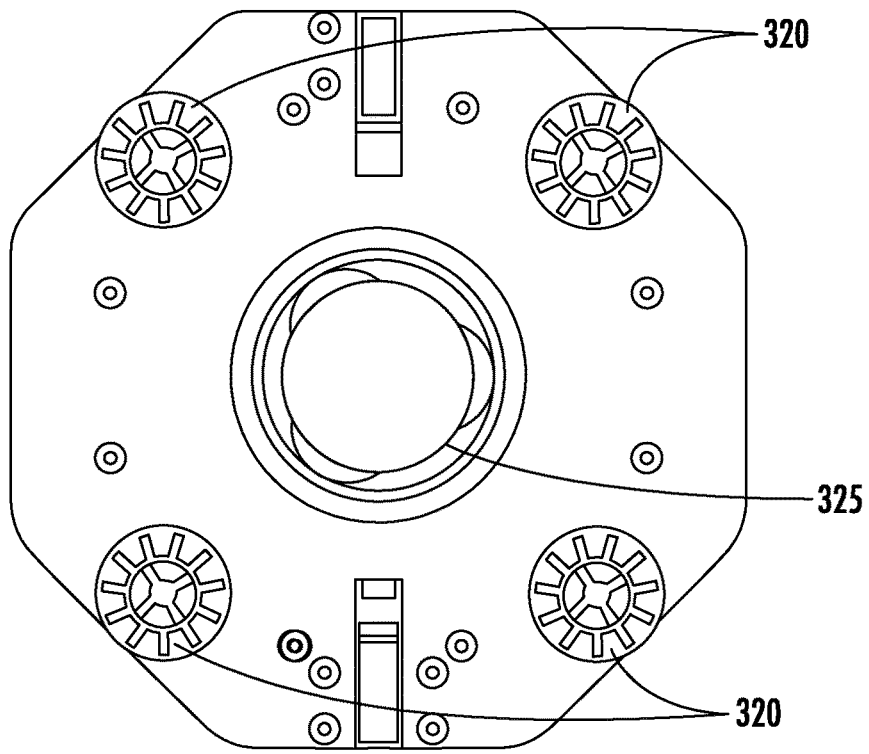
Figure 3E:
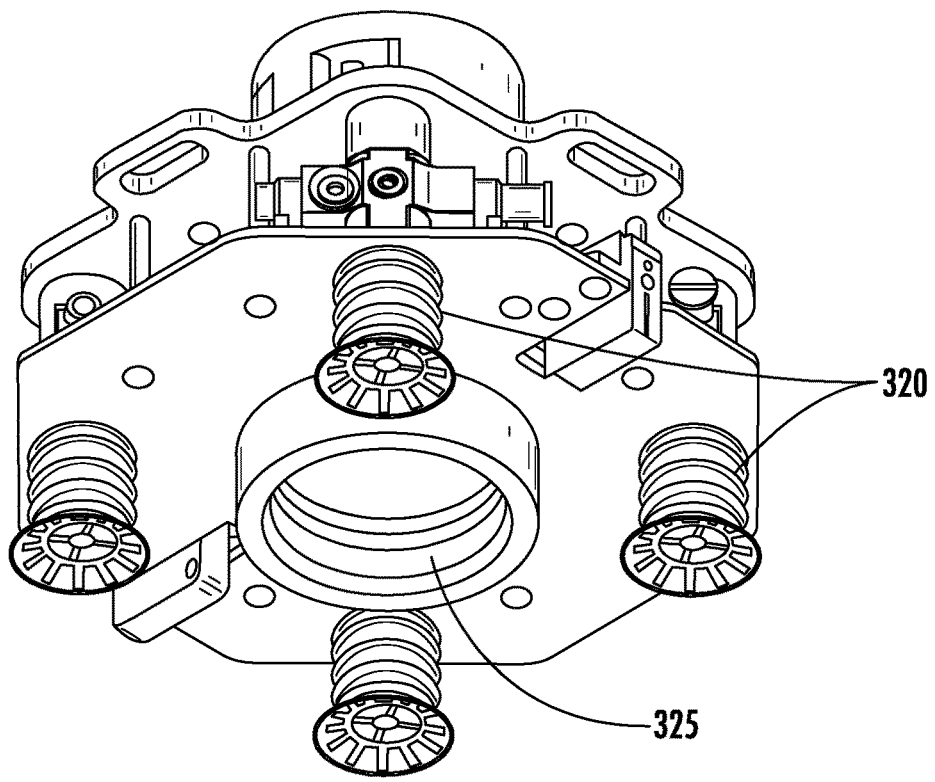

The robotic arm portion 305, as shown in FIG. 3a, is rotatably attached to the end effector 310 through a mount 330. The end effector 310 may include any manipulator with a suitable gripping means, such as, but not limited to, vacuum, claw, finger, plate, and the like, for picking and handling the item 110.

In accordance with an example embodiment of the present disclosure, the end effector 310 may include a vacuum gripper 315, as shown in FIGS. 3a-3e. The vacuum gripper 315 may include one or more flexible suction cups 320 and/or one or more rigid gripper 325. For instance, in some example embodiments, the end effector 310 may define at its one end, a configuration of the vacuum gripper 315 having four flexible suction cups, positioned at a respective corner defined by a bottom surface of the vacuum gripper 315 and one rigid gripper positioned at a center of the bottom surface of the vacuum gripper. In an alternate example embodiment, the end effector 310 may include another configuration of the vacuum gripper 315 having six flexible suction cups and two rigid grippers positioned on the bottom surface of the vacuum gripper 315.

Accordingly, in various example embodiments, the end effector 310 may include different configurations of vacuum gripper 315 having varying number of flexible suction cups and/or rigid grippers so as to engage items of different body shapes and different characteristics (e.g., weight, center of gravity, etc.). In this way, items are not mishandled or dropped during a movement of the end effector 106 and/or re-orientation of the items, as the items are handled.

According to various example embodiments described herein, the robotic tool 300 may further include a vacuum source or a vacuum generator (not shown) for generating a vacuum suction force within the one or more flexible suction cup 320 and the one or more rigid gripper 325. In operation, the vacuum generator may draw vacuum suction force through the respective one or more flexible suction cups 320 and the one or more rigid gripper 325. For instance, in some example embodiments, the one or more flexible suction cups 320 and the one or more rigid gripper 325 may engage a surface of the item 110 based on a first vacuum suction force generated through the flexible suction cups 320 and/or a second vacuum suction force generated through the one or more rigid gripper 325. Each of the flexible suction cups 320 and the one or more rigid gripper 325 may be in fluidic communication with one or more vacuum generators (e.g., via a plenum or one or more vacuum rods (not shown)). In an example embodiment, the vacuum suction force drawn through the respective vacuum rods and through the respective one or more flexible suction cups 320 and the one or more rigid gripper 325 may enable the end effector 310 to engage a surface of the item 110 so as to manipulate the item 110.

In some examples, the one or more flexible suction cups 320 may be actuated by the controller to engage items having flexible body shape (e.g., parcels, polybags, paper bags, envelops and/or the like). In some examples, the one or more rigid gripper 325 may be actuated to grip items having rigid body shape (e.g., boxes, cartons, containers, totes, and/or the like). In some examples, both the one or more flexible suction cups 320 and the one or more rigid gripper 325 may be actuated for engagement of the item 110. Further, based on the body shape of the item 110 handled by the item manipulation system 102, varying amounts of suction forces may be generated through the respective one or more flexible suction cups 320 and the one or more rigid gripper 325.

As described above, the end effector 310 may be attached to the robotic arm portion 305 through a mount 330 such that the end effector 310 may be capable of rotating with respect to the robotic arm portion 305. For rotating an item 110, the vacuum gripper 315 may contact the item 110 in a first orientation. As described above, based on the position, size, and/or weight of the item 110, a vacuum suction force may be created in one or more of the flexible suction cups 320 and/or the one or more rigid gripper 325 for picking the item 110 in the first orientation.

In one or more example embodiments of the present disclosure, the robotic tool 300 may further include one or more sensors (e.g., a force sensor, a torque sensor, and/or a distance sensor) configured to measure characteristics of the item 110 (e.g., weight, position, orientation, center of gravity, size, etc.). Thus, the position, size, and/or weight of the item 110 may be determined by the robotic tool 300 or any other subsystem of the material handling system 100.

Further, in some example embodiments, the control system and/or any other subsystem of the material handling system 100 may determine, via the vision system 115, that the item 110 is to be manipulated from the first orientation to a second orientation. For example, the control system may determine a need of reorienting the item 110 before placing the item 110 onto a downstream conveyor and/or section of the material handling system 100. As an example, a label and/or a marker placed on the item 110 may be positioned upside down, the item 110 may have a longer edge that may jam in the downstream conveyor, or the item 110 may need to be oriented in a specific orientation to fit a palletizing pattern. Upon determining that the item 110 needs to be reoriented, the end effector 106 may be controlled to rotate about the mount 330 in order to change the position and/or the orientation of the item 110. In some embodiments, the end effector 106 may be rotated in a clockwise direction to rotate the item 110 within a range from about 0 degrees to about 180 degrees to align a label placed on the item 110 for scanning. Further, once the item 110 is reoriented, the robotic arm portion 305 may be moved to position the end effector 106 at a position so as to place the item 110 on the conveyor 130.

The vacuum gripper 315 of the end effector 310 also includes one or more ejectors that may be actuated for respective flexible suction cups 362 and/or the one or more rigid gripper 364 for releasing the item 110 onto the conveyor 130 in the second orientation. Accordingly, once the item 110 is reoriented, the robotic tool 300 may place the item 110 on the conveyor 130 and may activate one or more ejectors for respective one or more flexible suction cups 320 and/or the one or more rigid gripper 325 for releasing the item 110 onto the conveyor 130 in the second orientation. In an embodiment, the ejector may receive compressed air fed into the one or more flexible suction cups 320 and the one or more rigid gripper 325. It should be noted that the robotic tool 300 may reorient the item 110 in-hand while holding the item 110, or may reorient the item 110 in one or more steps while picking and/or placing the item 110.

Figure 4:
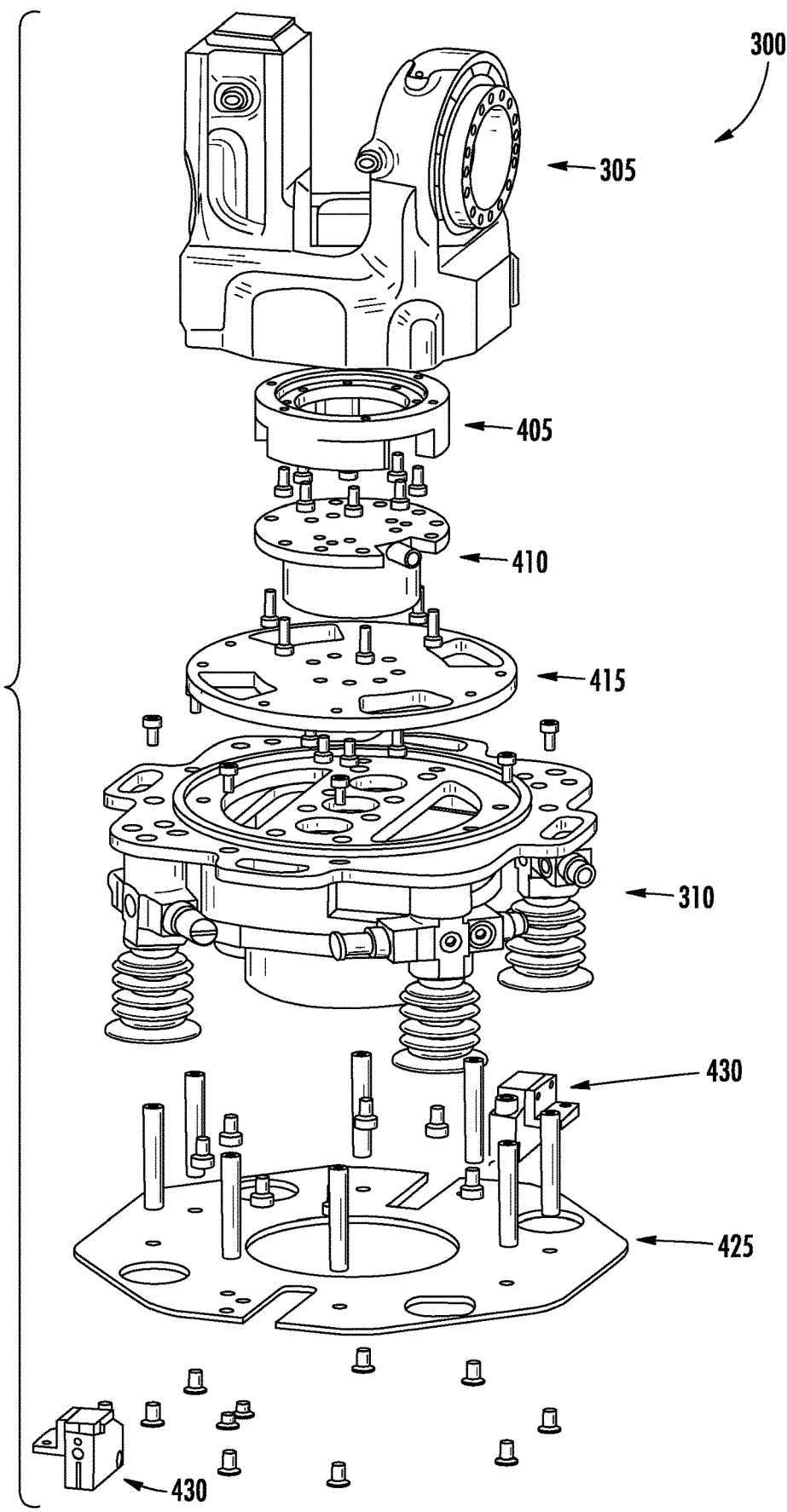
FIG. 4 illustrates an exploded view of the robotic tool, in accordance with one or more embodiments of the present disclosure.

FIG. 4 illustrates an exploded view of the robotic tool 300, in accordance with an embodiment of the present disclosure. The robotic tool 300 includes a robotic arm portion 305 attached to a robot flange adapter 405. The robot flange adapter 405 may include and/or be attached to at least one sensor 410 mounted on a sensor mounting flange 415. In an embodiment, the at least one sensor 410 may include a plurality of sensors (e.g., force sensor, torque sensor, distance sensor, and/or the like) to measure different characteristics of the item 110. In an embodiment, the at least one sensor 410 may determine a weight distribution and/or center of gravity of the item 110 and generate sensor data. Based on processing the sensor data generated by the at least one sensor 410, the control system may cause the vacuum generators to control generation of the vacuum suction force through each of the one or more flexible suction cups 320 and/or the one or more rigid gripper 325. The sensor mounting flange 415 is further attached to the vacuum gripper 315. The vacuum gripper 315 includes a dust plate 425 at the bottom of the vacuum gripper 315, as shown in FIG. 4.

In an embodiment, the robotic tool 300 further includes a laser range finder 430, as shown in FIG. 4. As shown, the laser range finder 430 is disposed on a distal end of the end effector 310. The laser range finder 430 is configured to identify (e.g., periodically or continuously over a period of time), the item 110 positioned in the first orientation. The laser range finder 430 is also configured to determine a distance at which the item 110 is positioned with relative to the vacuum gripper 315. For example, in some embodiments, the laser range finder 430 may determine the distance between a top surface of the item 110 and an end of the vacuum gripper 315 (e.g., between the one or more flexible suction cups 320 and the one or more rigid gripper 325). Based on the determined distance, the controller may cause the robotic arm portion 305 to position the end effector 310 into different operating positions. For instance, in some example embodiments, based on the determined distance communicated to the controller, the end effector 310 may be moved into at least one of: the picking position to pick the item 110 in the first orientation, the gripping position in which the one or more flexible suction cups 320 and/or the one or more rigid gripper 325 can be selectively actuated to grip the item 110, the retrieval position in which the end effector 310 is moved to retrieve the item 110 from amongst multiple items on a conveyor, and the discharging position, in which the end effector 310 is moved to place the item 110 in the second orientation by ejecting the item 110 engaged to the end effector 310 based on ejectors of respective of the one or more flexible suction cups 320 and/or the one or more rigid gripper 325. In accordance with some example embodiments herein, the laser range finder 430 may include a light source configured to emit a laser beam or light rays, and trace a time of flight of the emitted light to contact the item 110 and return to the laser range finder 430 (e.g., reflection).

Figure 5:
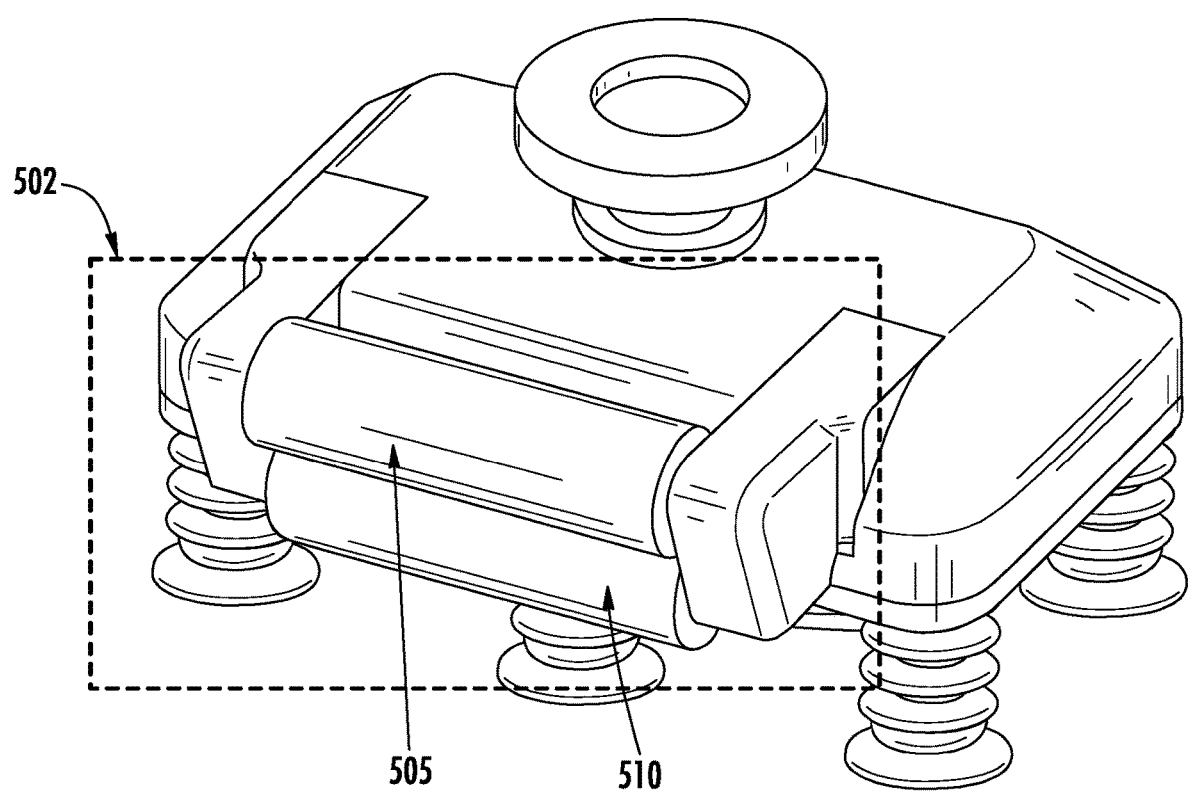
FIG. 5 illustrates a perspective view of the robotic tool, in accordance with another embodiment of the present disclosure.
Figure 6:
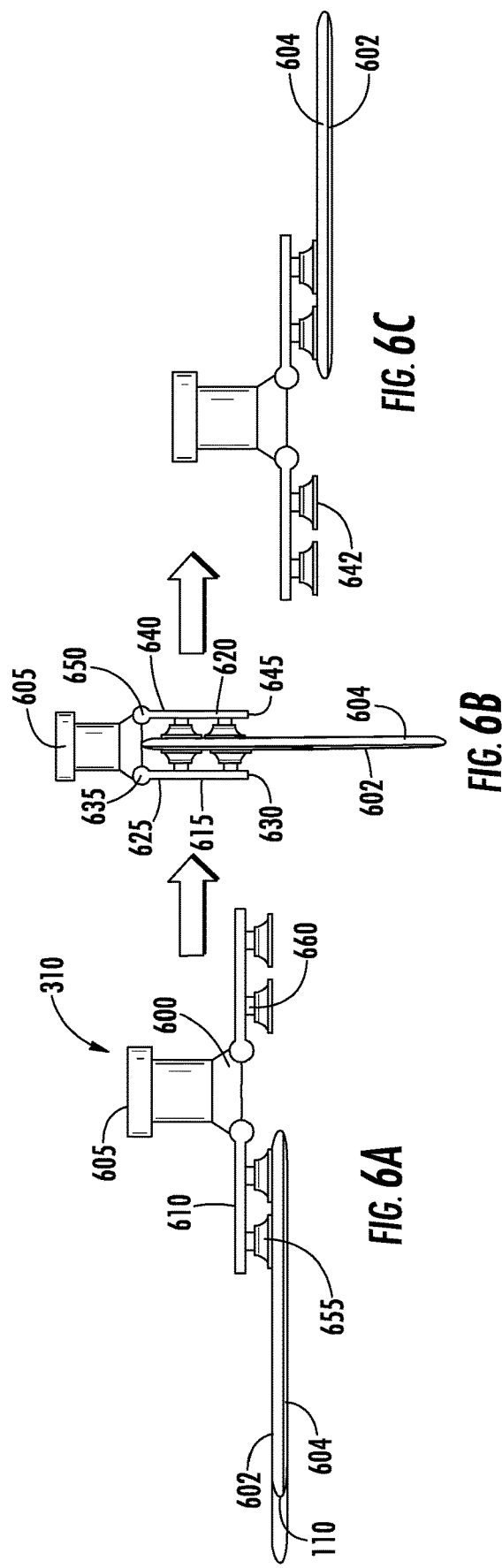
FIGS. 6a-6c illustrate views of an end effector, in accordance with one or more embodiments of the present disclosure.
Figure 7:
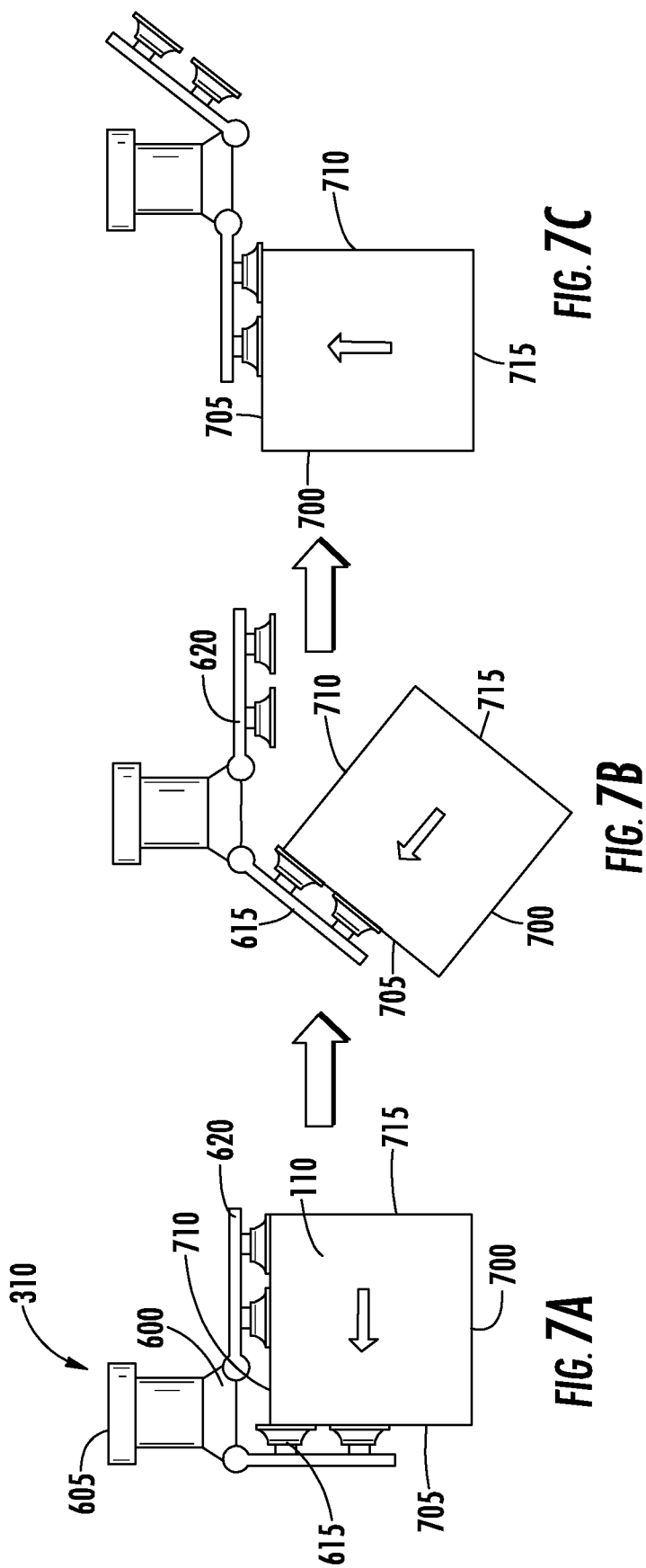
FIGS. 7a-7c illustrate a perspective view of the end effector, in accordance with one or more embodiments of the present disclosure.

FIG. 5 illustrates a perspective view of another end effector 500 in accordance with another embodiment of the present disclosure. The end effector 310 includes a roller gripper 502 along with the one or more flexible suction cups 320 and the one or more rigid gripper 325, as described in FIGS. 3a-3e and 4. The roller gripper 502, is configured for gripping items having thin body shape, (e.g., polybags, envelops, paper bags, and/or the like). The roller gripper may include at least two rollers 505 and 510 disposed adjacent to one another. In an embodiment, the two rollers 505 and 510 are disposed on top of each other, as shown in FIG. 5. Further, each of the two rollers 505, 510 may be controlled individually, such that the two rollers 505, 510 may rotate in opposite directions to pinch and hold at least a portion of the item 110 between the two rollers 505, 510 for picking the item 110. For example, roller 505 may rotate in clockwise direction while the roller 510 rotates in counter-clockwise direction to hold and pick the item 110. Further, each of the two rollers 505, 510 may rotate in a release direction to release the item 110 held by the end effector 310. For example, for placing the item 110 onto a conveyor, both the rollers 505 and 510 may rotate in clockwise or counter-clockwise direction to release the portion of the item 110 held between the rollers 505, 510, and thus, to release the item 110 from the roller gripper 502.

FIGS. 6a-6c illustrate perspective views of another configuration of the end effector 310 in accordance with another example embodiment of the present disclosure. The end effector 310 includes a pinch gripper 600 for picking, reorienting, and placing an item 110 onto a conveyor 130 of the material handling system 100. The pinch gripper 600 may include a mount 605 attached to the robotic arm portion 305 of the robotic tool 300. The pinch gripper 600 may further include a plurality of plates 610 attached to the mount 605. In an embodiment, the pinch gripper includes a first plate 615 and a second plate 620 attached to the mount 605 such that a proximal end 625 of the first plate 615 is pivotally attached to the mount 605 at a pivot point 635, and a distal end 630 of the first plate 615 is capable to rotating freely about the pivot point 635. Similarly, the proximal end 640 of the second plate 620 is pivotally attached to the mount 605 at a pivot point 650, and a distal end 645 of the second plate 615 can rotate freely about the pivot point 650. In an embodiment, one or both the first plate 615 and the second plate 620 may further include one or more suction cups 642 attached to at least a bottom surface of the two plates 615 and 620, as shown in FIGS. 6a-6c. The suction cups 642 act as a gripping means for picking and holding the item 110 by the pinch gripper 600. Further, the pinch gripper 600 may reorient the item 110 while holding the item 110 between the two plates 615 and 620.

Specifically, in accordance with an exemplary embodiment, as shown in FIGS. 6a-6c, the pinch gripper 600 picks up a relatively flat item 110 by holding a first edge 602 of the item 110 by contacting a first set of suction cups 655 on the first plate 615 to the first edge 602 of the item 110. Thus, the item 110 is picked up by the pinch gripper 600 in a first orientation, as shown in FIG. 6a. For reorienting the item 110, the pinch gripper 600 rotates the first plate 615 about the pivot point 635 towards (e.g. in the direction of) the second plate 620, as shown in FIG. 6b. The second plate 620 may also be rotated about the pivot point 650, to enable a second set of suction cups 660 on the second plate 620 to contact a second edge 604 of the item 110. Once the second edge 604 of the item 110 is grasped by the second plate 620, the first plate 615 releases the first edge 602 of the item, by activating an ejector for the first set of suction cups 655. Thus, the item 110 is picked up by the first plate 615 in the first orientation and reoriented to a second orientation while transferring the item 110 to the second plate 620. The second plate 620 may then rotate about the pivot point 650 to place the item 110 onto a conveyor in the second orientation, as shown in FIG. 6c.

FIGS. 7a-7c illustrate a perspective view of the end effector 310 in accordance with another example embodiment of the present disclosure. In this example embodiment, the pinch gripper 600 is used to reorient a three-dimensional item 110, such as, a box, having four edges 700, 705, 710, and 715, as shown in FIGS. 7a-7c. The item 110 may be placed on a conveyor in a first orientation, such that the edge 700 of the item 110 may be in contact with the conveyor. On determining that the item 110 needs to be reoriented to place the edge 705 at the top, for label scanning, for example, the first plate 615 of the pinch gripper 600 rotates and grasps the edge 705 of the item 110 and the second plate 620 grasps the adjacent edge 710 of the item 110, as shown in FIG. 7a. Once the item 110 is picked by the pinch gripper 600, the edge 710 may be released by the second plate 620, while rotating the first plate 615 away from the second plate 620, as shown in FIG. 7b. This results in the item 110 reoriented to a second orientation, such that the edge 705 is at the top and the edge 715 is at the bottom of the item 110. The pinch gripper 600 may then place the item 110 in the second orientation onto a conveyor, as shown in FIG. 7c.

Figure 8:
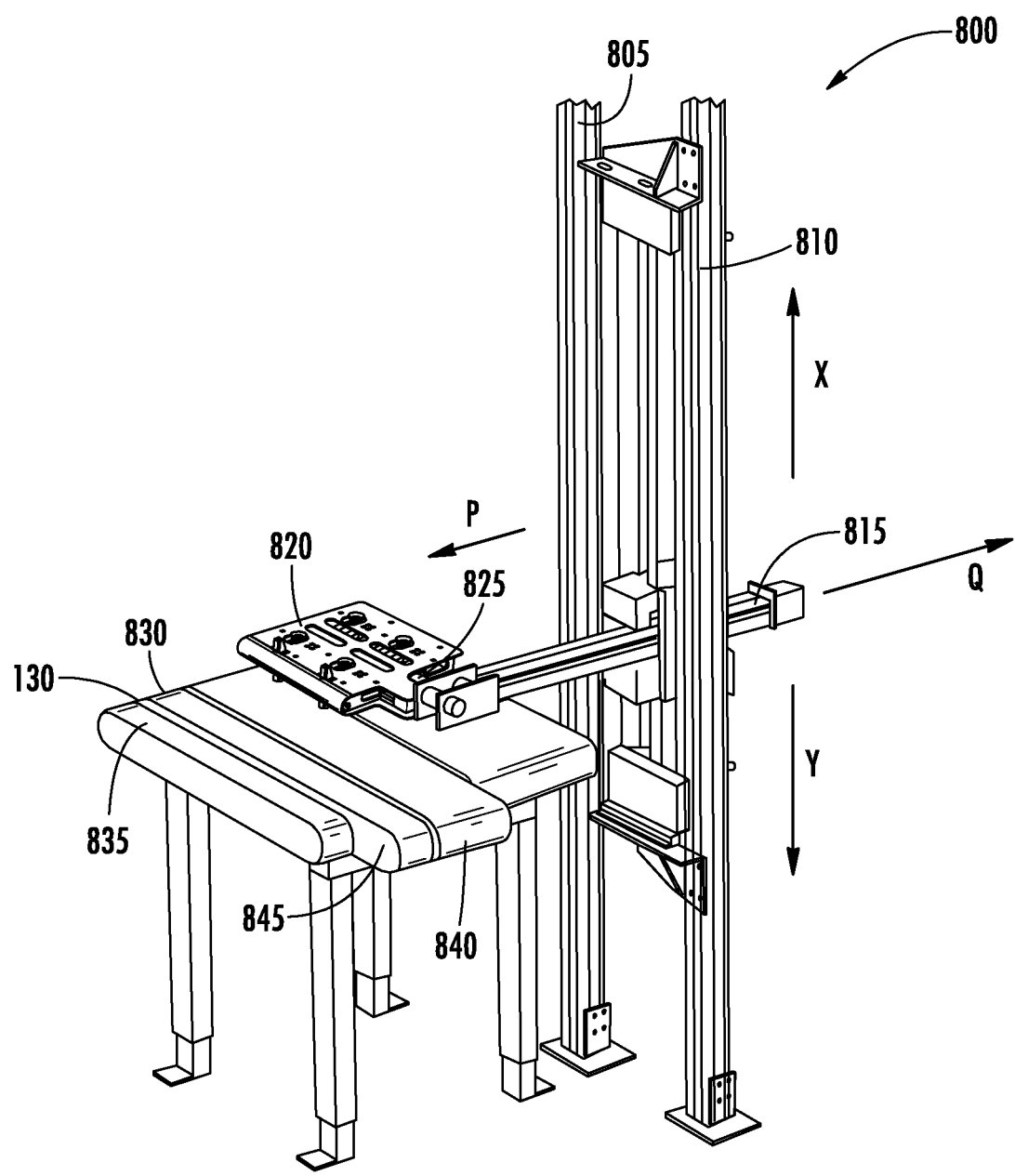
FIG. 8 illustrate views of a flipper unit, in accordance with one or more embodiments of the present disclosure.

According to some example embodiments, a configuration of the end effector 310 may include a flipper table. An example of such end effector, is illustrated in FIG. 8 which represents a perspective view of a flipper unit 800 configured to manipulate the item 110 based on flipping the item 110. The flipper unit 800 may be a part of the repositioning system 105 of the material handling system 100, described earlier. In accordance with some example embodiments, the flipper unit 800 is configured to receive the item 110 in a first orientation on a flipper table, and rotate the flipper table about its axis, to flip the item 110 for placement onto a conveyor in a second orientation.

Illustratively, the flipper unit 800 includes at least two posts (e.g., posts 805 and 810) and a robot arm portion 815. The robot arm portion 815 is mounted between the posts 805 and 810 at a proximal end of the robot arm portion 815. The robot arm portion 815 is also pivotably engaged to one end of an end shaft 825. Further, a flipper table 820 is pivotally connected to a distal end of the robot arm portion 815 through the end shaft 825. In accordance with said example embodiments, the robot arm portion 815 is capable of moving upwards in a direction X and downwards in a direction Y along the posts 805, 810, and/or outwards relative to the posts 805, 810 in a direction P and inwards relative to the posts 805, 810 in a direction Q.

In accordance with said example embodiments, the end shaft 825 illustrated herein, is connected at one end of the flipper table 820 and is adapted to rotate about its axis, thereby rotating the flipper table 820. The rotation of the end shaft 825 may be caused based on a drive motor of the flipper table 820, details of which are described later.

In accordance with various example embodiments described herein, the flipper table 820 may receive one or more items, for example the item 110, for manipulation by the flipper table 820. For instance, in some examples, the flipper table 820 may receive the item 110 on a top surface of the flipper table 820. Alternatively, in some other examples, the flipper table 104 may receive the item 110 from a conveyor, for example, the conveyor 130 or the chute 125 positioned proximate to the flipper table 820. Additionally, and/or alternatively, in some embodiments, the flipper table 820 may also receive one or more items via a bottom surface of the flipper table 820. In this regard, the bottom surface of the flipper table 820 may also include one or more bottom suction cups that may engage the item on the bottom surface. Thus, the flipper table 820 may receive the item 110 for manipulation in the first orientation to the second orientation, on either of the top surface or the bottom surface, from the chute 125 or from the conveyor 130, respectively. The flipper table 820, upon receiving the item 110 is adapted to position the item in the second orientation which is different from the first orientation. In this regard, in accordance with some embodiments, the flipper table 820 receives the item 110 in a first orientation and rotates between 0 degrees to 360 degrees, depending on an orientation, to place the item 110 onto the conveyor 130 in a second orientation.

Thus, the flipper table 820 is adapted to receive the item 110 in the first orientation and flip to place the item 110 onto the conveyor 130 in the second orientation. In an exemplary embodiment, the conveyor 130 may include or be attached to an orientation table 830, as shown in FIG. 8. The orientation table 830 may include a plurality of strip belts 835. Each strip belt 835 may be independently controllable in terms of speed, direction, etc. to convey and/or rotate the item 110. For example, the orientation table 830 may include a wide belt 840 and a narrow belt 845, as shown. The flipper table 820 may place smaller items onto the wide belt 840 for conveyance. Further, for rotating a larger item placed on more than one strip belts 835, the strip belts 835 contacting the item may be driven at different speeds and/or direction to rotate the item in contact with the strip belts 835. In another embodiment, one or more of the strip belts 835 may be driven in one direction to convey an item to further downstream conveyors, and/or may be driven in an opposite direction to dispense rejected items off the conveyor 130. Similarly, the orientation table 830 may be used for any sortation related application as well.

Figure 9A:
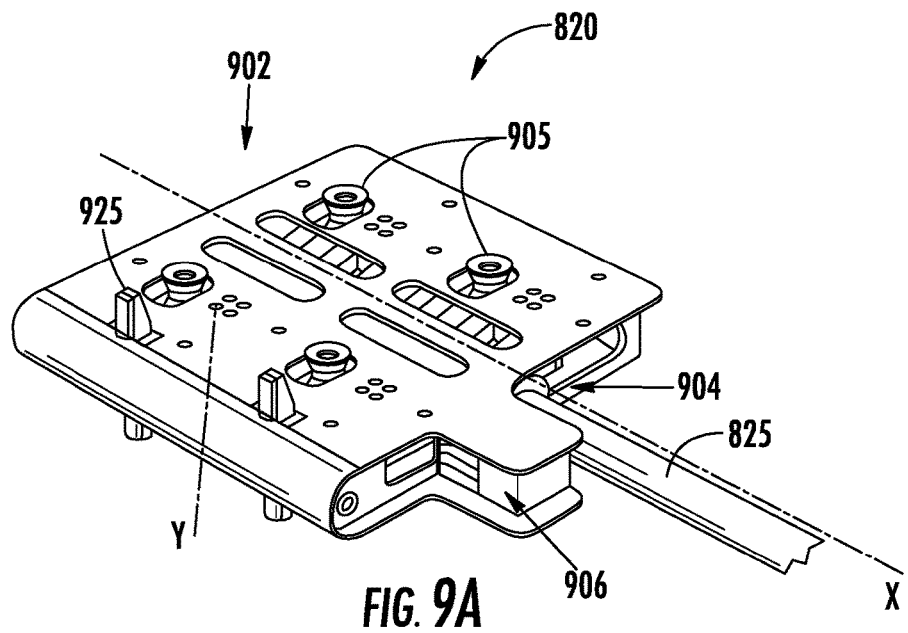
FIGS. 9a and 9b illustrate a perspective and exploded view of the flipper unit, in accordance with an embodiment of the present disclosure.
Figure 9B:
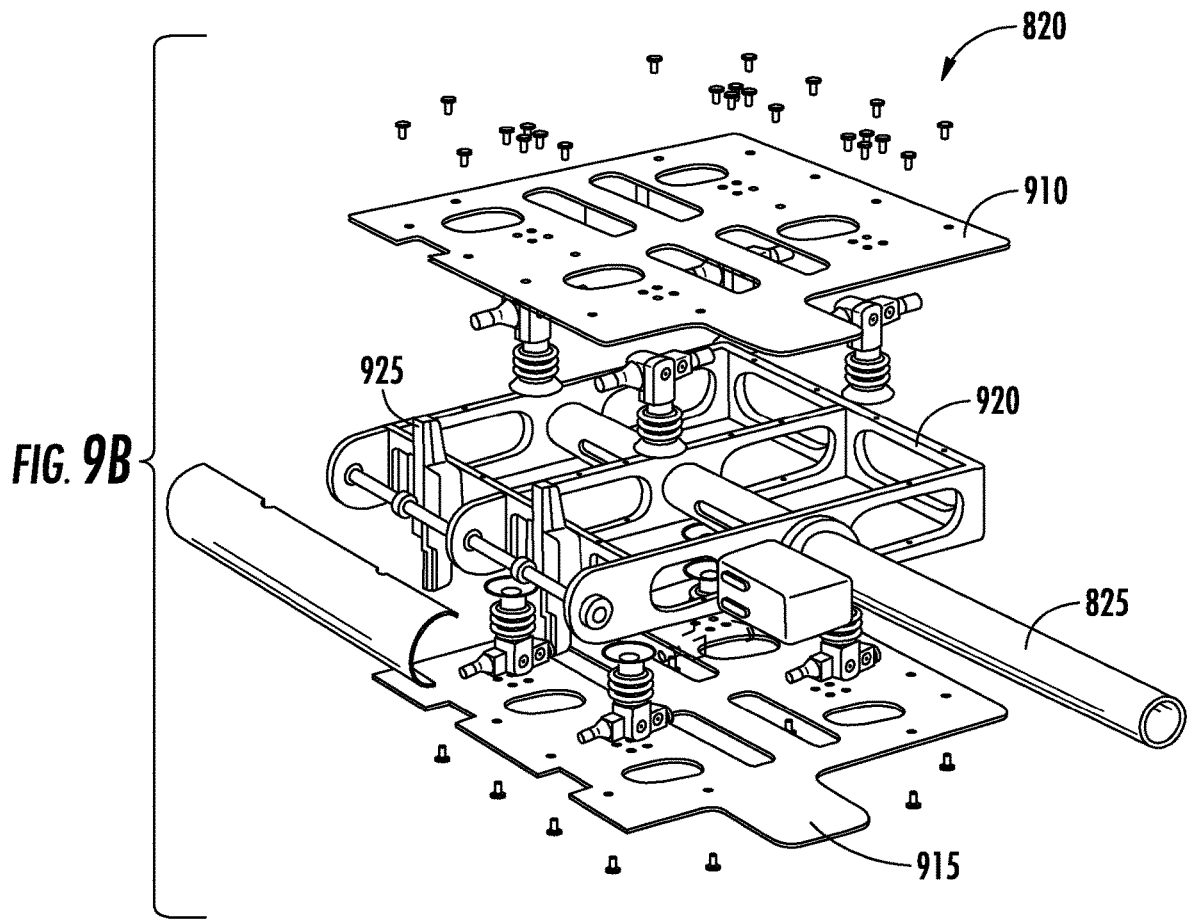

FIGS. 9a and 9b illustrate a perspective and an exploded view of the flipper table 820, in accordance with one or more embodiments of the present disclosure. As described above, the flipper table 820 may receive an item 110 in a first orientation and may flip the item 110 for placement onto a conveyor in a second orientation. In an embodiment, the flipper table 820 includes one or more suction cups 905 disposed on a top and/or a bottom surface of the flipper table 820. The suction cups 905 may be used to grasp and hold the item 110 while the item 110 is bring conveyed and/or flipped by the flipper table 820.

Illustratively, the flipper table 820 includes a body 902 which is rotatable about an axis X. The body 902 defines, an end 904, mechanically attached to the end shaft 825 which is coupled to a drive motor 306. In this aspect, the drive motor 906 is adapted to control rotation of the end shaft 825 about the axis X. In accordance with said example embodiments, the body 902 of the flipper table 820 is adapted to manipulate the item 110 from the first orientation to the second orientation, upon actuation of the end shaft 825 via the drive motor 906 which rotates the end shaft 825.

FIG. 9b shows an exploded view of the flipper table 820. As shown, the flipper table 820 includes a top plate 910 and a bottom plate 915 attached to a central frame 920, such that the central frame 920 is sandwiched between the top plate 910 and the bottom plate 915. The end shaft 825 of the flipper unit 800 is attached to the central frame 920 of the flipper table 820, as shown. The flipper table 820 rotates about the end shaft 825 to flip an item 110, as will be described later with reference to FIG. 10 and FIG. 11. In an embodiment, the flipper table 820 may further include one or more adjustable height supports 925 disposed on the flipper table 820 for supporting the item 110 flipped by the flipper table 820. In accordance with various example embodiments described herein, the one or more adjustable height supports 925 is configured to extend relative to at least, the top plate 910 and/or the bottom plate 915 along the axis Y. In this aspect, the one or more adjustable height supports 925 is configured to extend relative to the body 902 of the flipper table 820 to support the item 110 positioned thereon on a respective plate of the flipper table 820. In this aspect, the one or more adjustable height supports 925 defines one or more teeth which supports locking with the body 902 of the flipper table 820 at a position, at which the one or more adjustable height supports 925 provides a support to the item 110 and may operate to prevent translation of the item 110 relative to the top or bottom surface of the flipper table 820.

In accordance with various example embodiments described herein, the one or more adjustable height supports 925 is adapted to abut to at least, with the top plate 910, thereby, supporting the item 110 positioned on the top plate 910. Similarly, the one or more adjustable height supports 925 is also adapted to abut with the bottom plate 915 to support an item held on the bottom plate 915.

In accordance with various example embodiments, the flipper table 820 may receive the item 110 in the first orientation on any of the top plate 910 or the bottom plate 915. Thus, as the item 110 is received on the top plate 910 or the bottom plate 915, the suction cups 905 on respective plates of the body 902 may be activated, by the controller, selectively to grasp the item 110 based on the vacuum suction force through the respective suction cups 905. Upon grasping a surface of the item 110 based on the vacuum suction force, the flipper table 820 is rotated about the X to manipulate the item 110 to position the item 110 for placement in a second orientation.

Figure 10A:
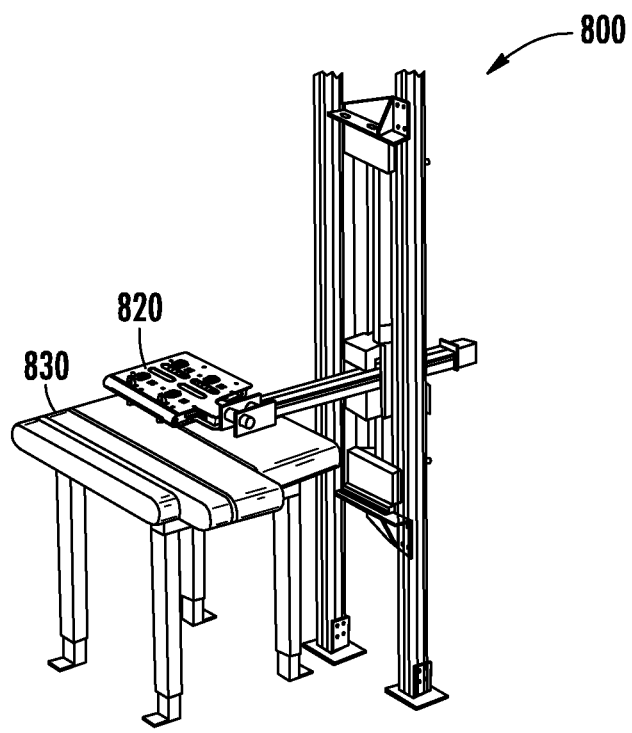
FIGS. 10a-10f illustrate perspective views of the flipper unit, in accordance with an embodiment of the present disclosure.
Figure 10B:
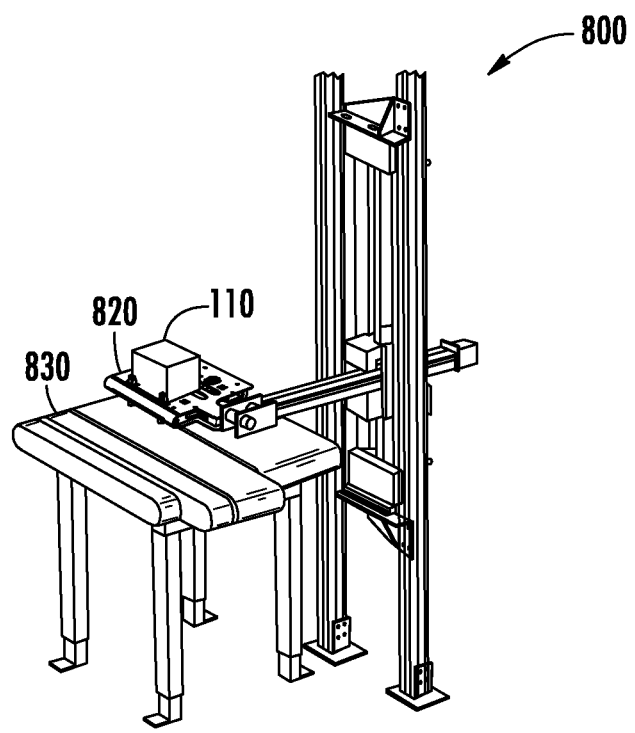

FIGS. 10a-10f, 11a, and 11b illustrates perspective views of the flipper unit 800 while flipping an item 110, in accordance with one or more embodiments of the present disclosure. The flipper unit 800 may pick the item 110 from a conveyor, such as the orientation table 830, and/or may receive the item 110 directly onto the flipper table 820, as shown in FIG. 10b. In this aspect, to receive the item 110, the flipper table 820 may be moved across the strip belts, (e.g., the narrow belt 840 and/or the wide belt 835) to a position, for instance, a position above the orientation table 830, based on movement of the robot arm portion 815.

In accordance with various example embodiments described herein, upon receiving the item 110, the flipper table 820 may hold the item 110 based on engagement of a surface of the item 110, (for instance, bottom surface of box shaped item) with the one or more suction cups 905 disposed on the top plate 910 of the flipper table 820, through the vacuum generated through the one or more suction cups 905. In accordance with said example embodiments, the item 110 placed on the flipper table 820 may further be supported by adjustable height supports 925 that may operate to prevent translation of the item 110 relative to the top or bottom surface.

Figure 10C:
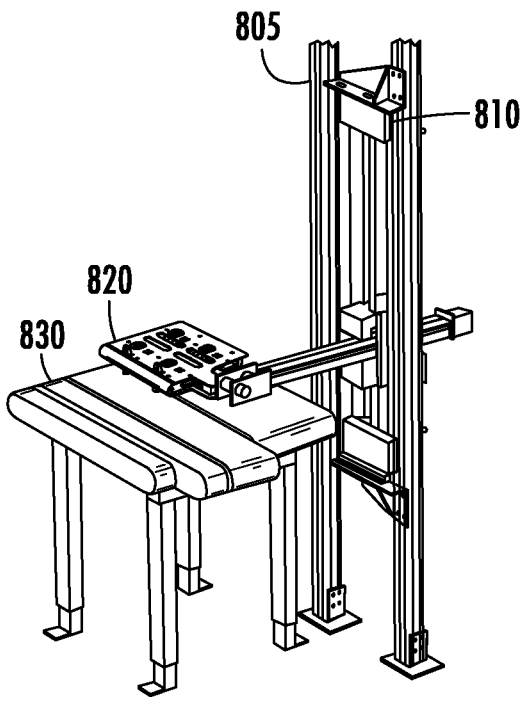

In accordance with some example embodiments, a controller coupled to the vision system 115 may determine a need for reorienting the item 110. With reference to FIG. 1, the vision system 115 may identify that the item 110 is positioned in the first orientation, such that a label 109 of the item 110 is not on a top surface of the item 110. Based on this information, the controller may determine the need for manipulation of the item 110. Upon determining that the item 110 needs to be manipulated, (e.g., flipped, repositioned, and/or reoriented), the end shaft 825 may rotate the flipper table 820 about the axis X of the end shaft 306. The flipper table 820 engaged to the end shaft 825 follows the rotation about the end shaft 825, as shown in FIG. 10c and flips, for example, to 180 degrees. The item 110 is now facing downwards and is held suspended by the flipper table 820 via the suction cups 905.

Figure 10D:
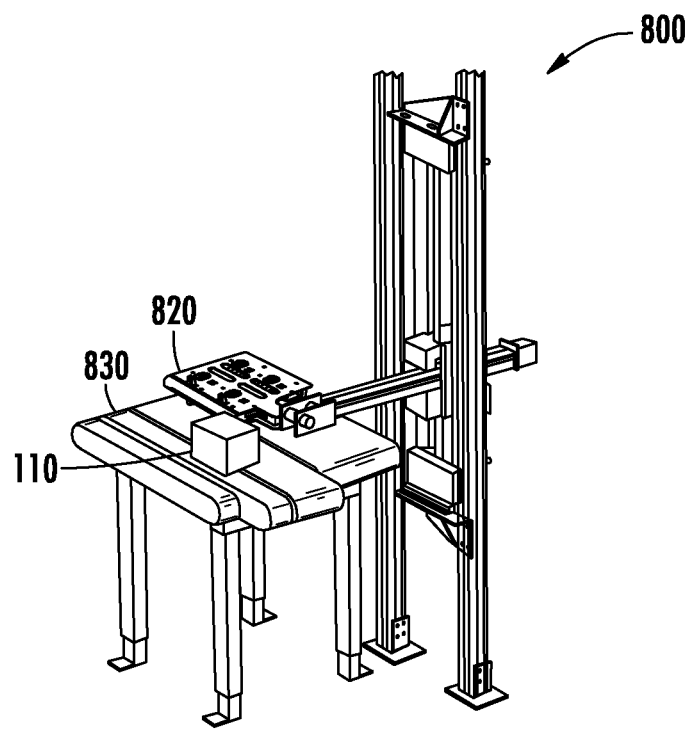
Figure 10E:
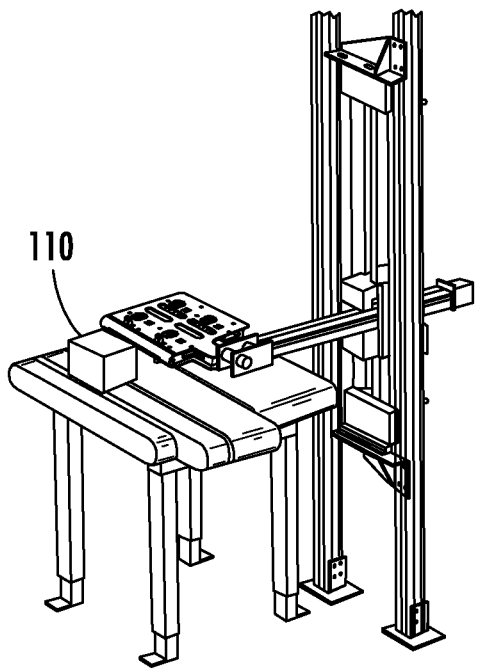
Figure 10F:
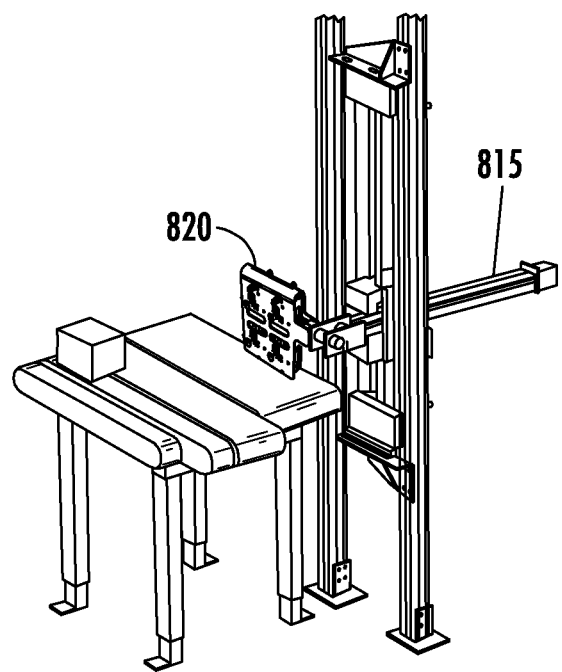
Figure 11A:
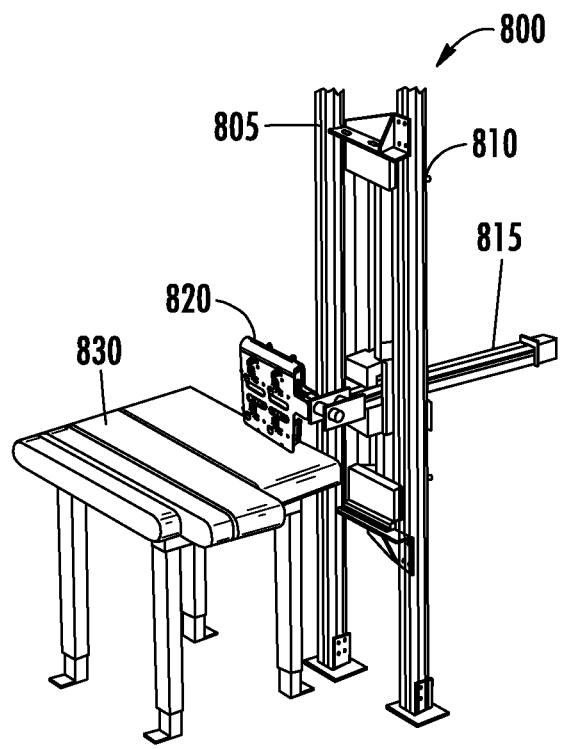
FIGS. 11a and 11b illustrate perspective views of the flipper unit in a stowed position, in accordance with one or more embodiments of the present disclosure.
Figure 11B:
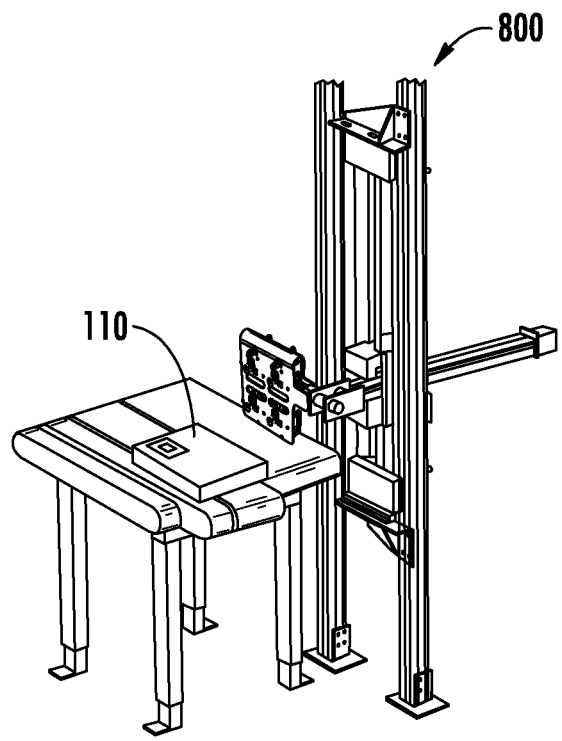

For releasing the item 110 onto the orientation table 830, as shown in FIG. 10d, the suction cups 905 may eject the item 110, as described above. Thus, the item 110 is reoriented from a first orientation, as shown in FIG. 10b, to a second orientation, as shown in FIG. 10c, by the flipper unit 800. Further, the flipper unit 800 may be used to reposition the item 110 on a conveyor and/or the orientable table 830. In this regard, the robot arm portion 815 may extend away from or retract towards the posts 805, 810, to place and/or reposition the item 110 onto the orientation table 830, at a position. Further, the robot arm portion 815 may move upwards and/or downwards within the posts 805, 810 in directions X or Y to handle items of different size and/or height. In an embodiment, once the item 110 is flipped and placed at a location on the orientation table 830, the robot arm portion 815 may retract towards the posts 805, 810, in the direction Q and the flipper table 820 may be rotatable about the end shaft 825 in a stowing position, such that the top plate 910 and the bottom plate 915 of the flipper table 820 is positioned proximal and parallel to the posts 805, 810 in the stowing position. The stowing position of the flipper unit 800 is shown in FIGS. 10f, 11a, and 11b.

FIGS. 12a-12d and 13a-3c illustrate perspective views of a flipper unit 1200, in accordance with one or more embodiments of the present disclosure. The flipper unit 1200 may include a flipper mesh 1205 for receiving the item 110 in a first orientation and flipping the item 110 for placement onto a conveyor 130 in a second orientation.

In an example embodiment, as shown in FIGS. 12a-12d and 13a-13c, the conveyor 130 is a strip belt conveyor. The flipper mesh 1205 may include a receiving platform 1210 such that one end 1215 of the receiving platform 1210 is pivotally attached to a shaft 1220 coupled to the conveyor 130. The other end 1225 of the receiving platform 1210 may pivot to one or more positions between 0 and 360 degrees. The receiving platform 1210 may be a plate, a mesh, and/or any other surface capable of receiving the item 110 for conveyance and/or flipping. In an embodiment, the receiving platform 1210 includes a plurality of elongated fingers 1230 positioned parallel to each other, such that one end of each of the plurality of elongated fingers 1230 is attached to the shaft 1220, and the other end of each of the plurality of elongated fingers 1230 is rotatable about the shaft 1220 to one or more positions between 0 and 360 degrees. In some example embodiments, the plurality of elongated fingers 1230 may rest within a gap between each of the plurality of strip belts below a surface of the conveyor 130. Thus, the item 110 may be received directly on the receiving platform 1210, or the item 110 may be received by the conveyor 130 and the flipper mesh 1205 may be raised from under the conveyor 130 only when the item 110 needs to be flipped.

Figure 12A:
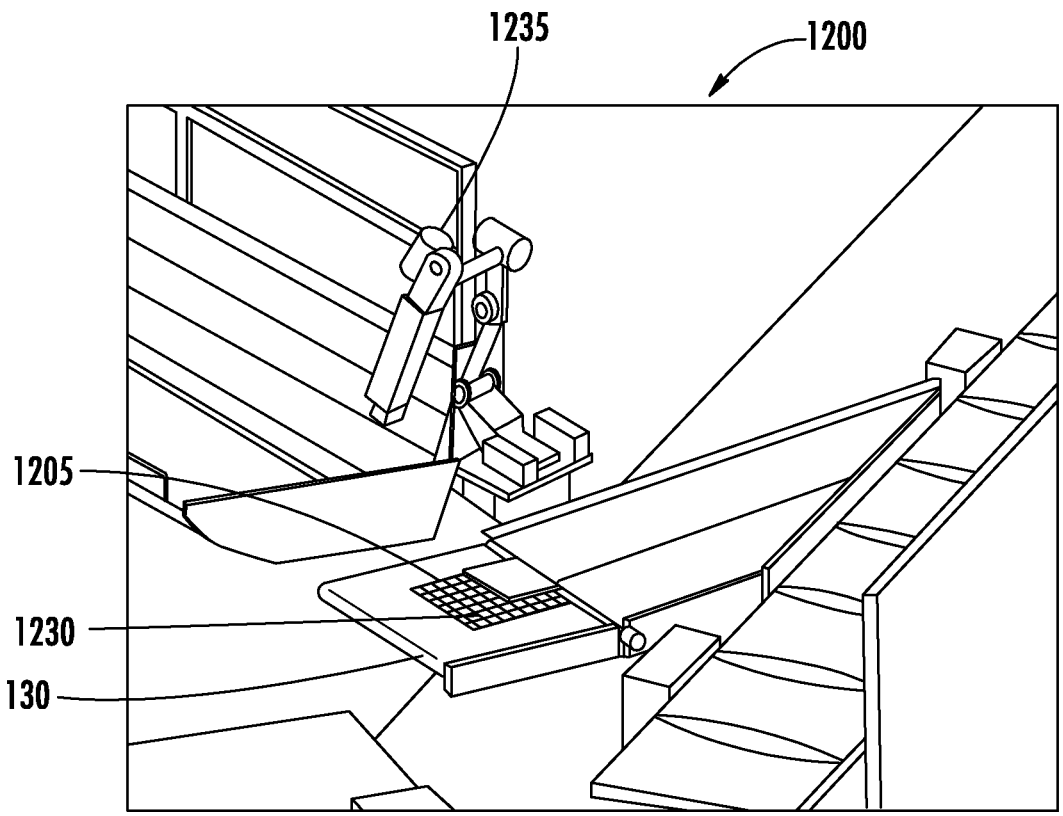
FIGS. 12a-12d illustrate perspective views of a flipper unit, in accordance with one or more embodiments of the present disclosure.
Figure 12B:
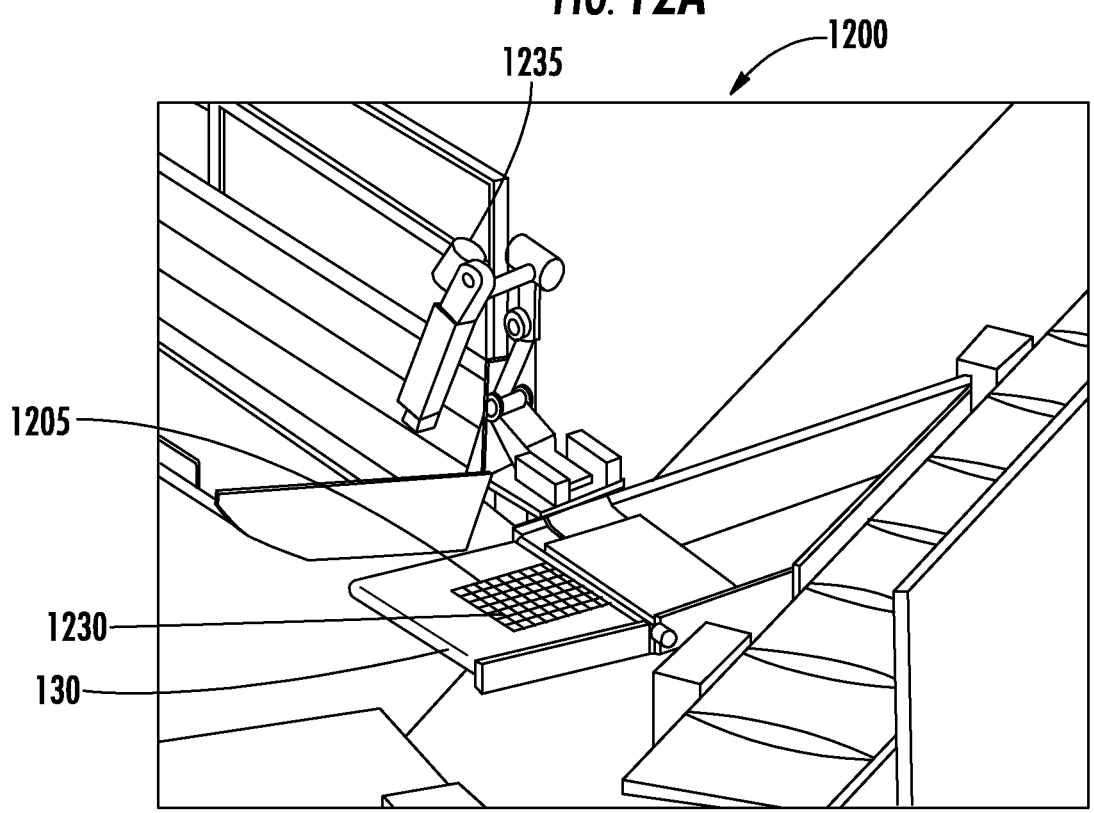
Figure 12C:
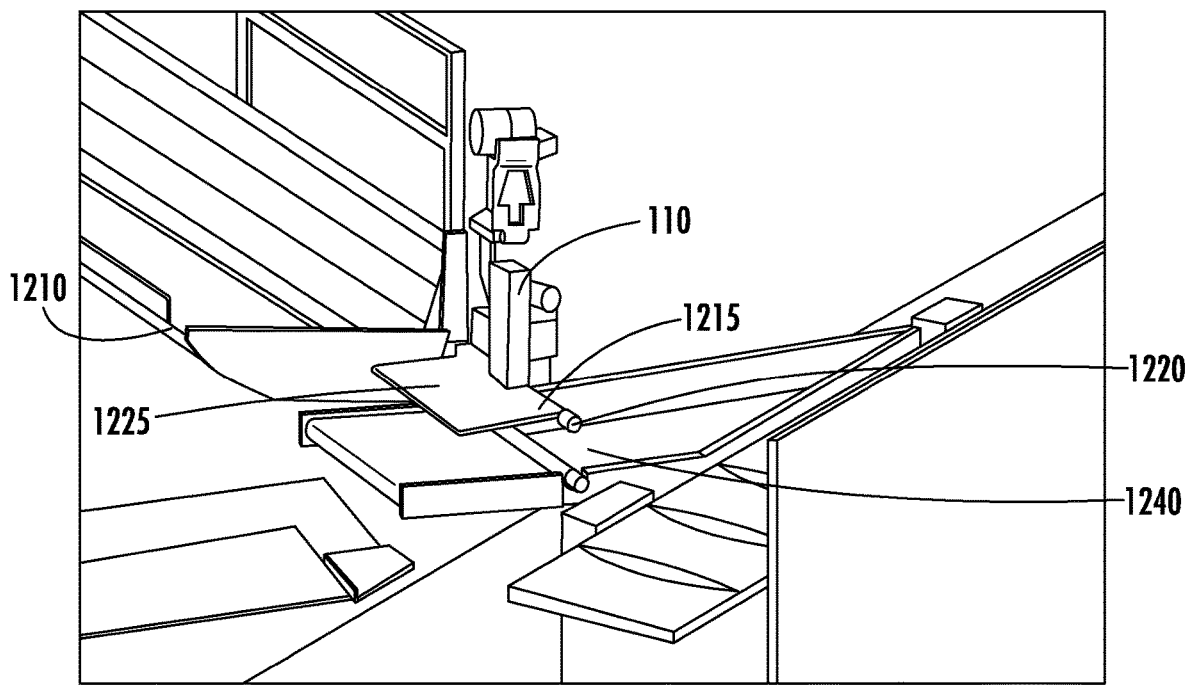
Figure 12D:
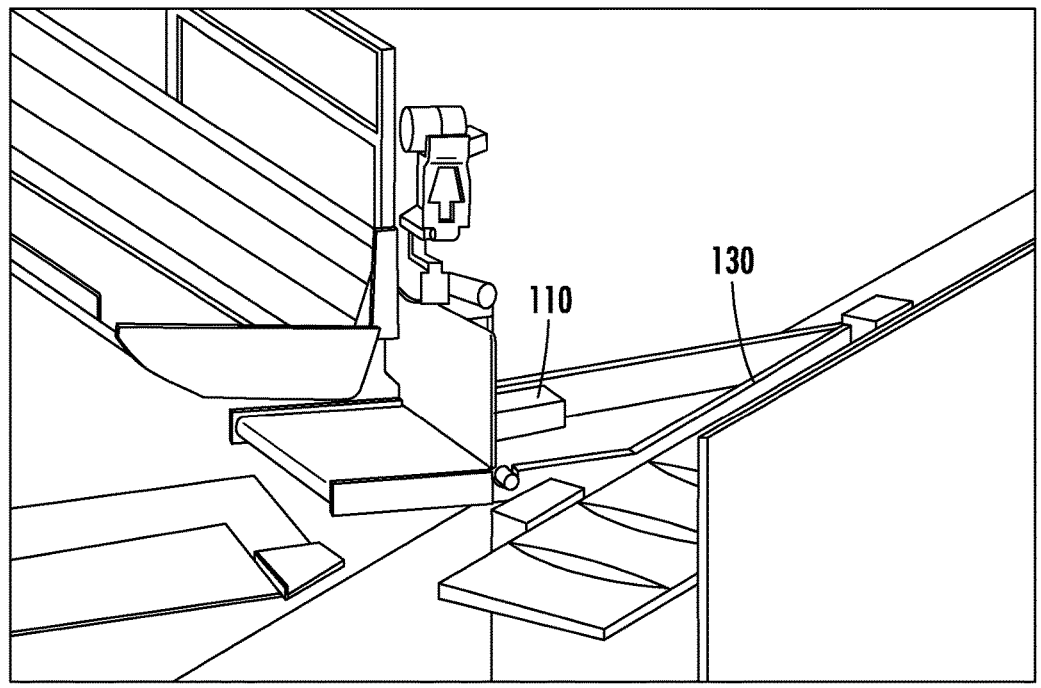
Figure 13A:
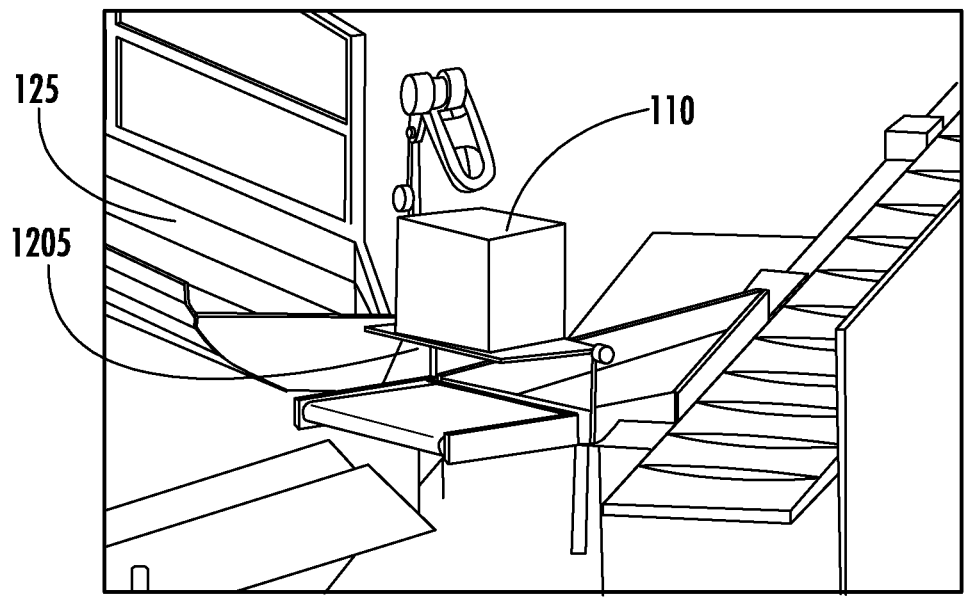
FIGS. 13a-13c illustrate perspective views of the flipper unit, in accordance with another embodiment of the present disclosure.
Figure 13B:
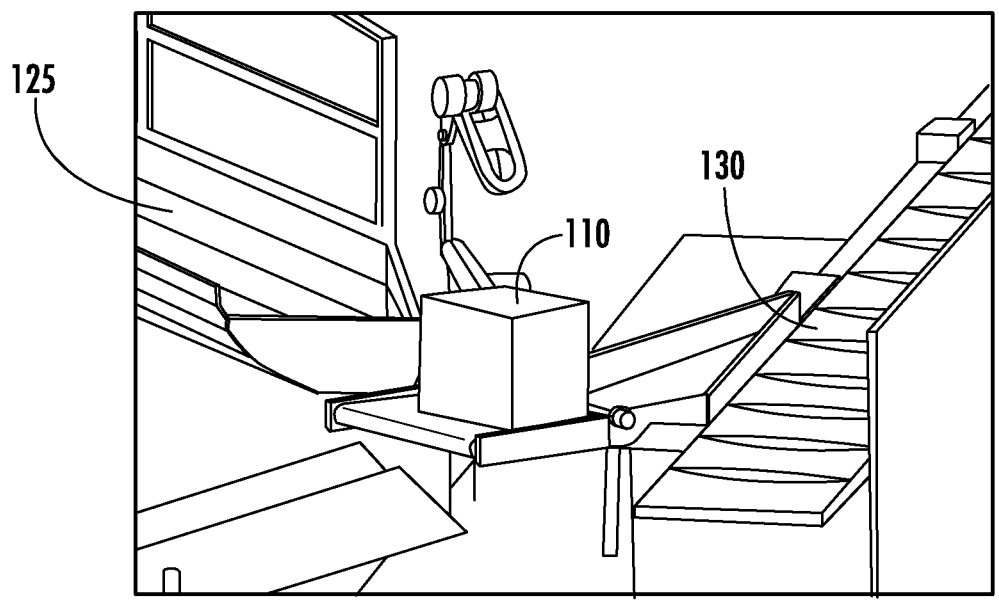
Figure 13C:
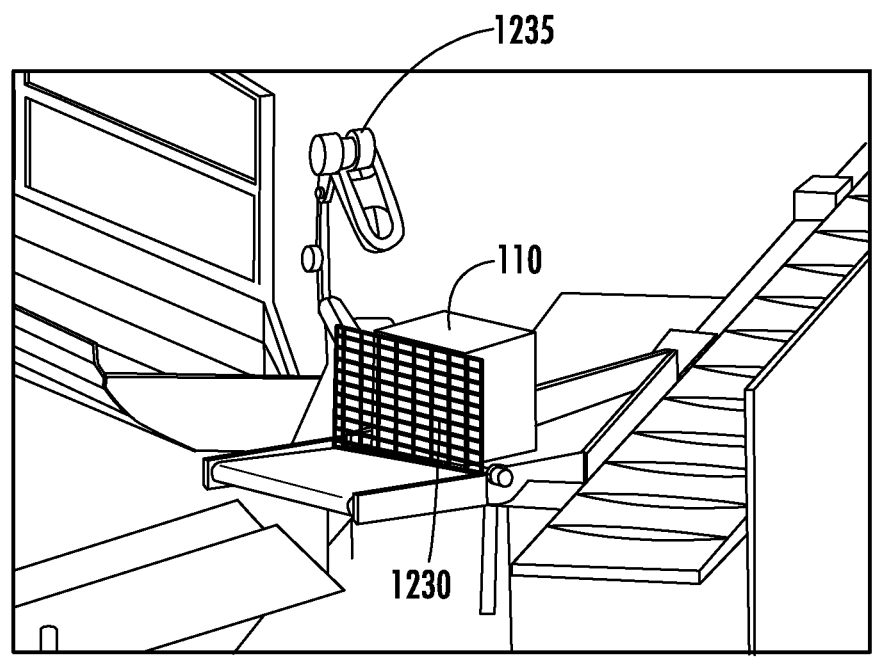

As shown in FIGS. 12a-12d and 13a-13c, the item 110 may be received directly from an upstream conveyor section, such as a chute, onto the flipper mesh 1205, and/or may be placed on the flipper mesh 1205 by a robotic arm 1235. The item 110 may be placed on to flipper mesh 1205 by the robotic arm 1235 in a specific orientation, or in a random orientation. The flipper unit 1200, and/or any other subsystem of the material handling system 100, may detect a current orientation (e.g., a first orientation) of the item 110 and may determine a second orientation of the item 110. The flipper mesh 1205 may then be rotated in a controlled manner to flip the item 110 into a required orientation (e.g., a second orientation). For example, the flipper mesh 1205 may be rotated by 180 degrees to flip an envelope, as shown in FIGS. 12a-12b, and/or may be rotated by 90 degrees to reorient a box, as shown in FIGS. 12c-12d and FIGS. 13a-13c. Further, the shaft 1220 of the flipper unit 1200 may be coupled to the conveyor 130 through a pivotable connector 1240, as shown in FIGS. 12c-12d and FIGS. 13a-13c. The pivotable connector 1240 may pivot downwards towards the conveyor 130 to position the flipper mesh 1205 in line with a top surface of the conveyor 130, and the pivotable connector 1240 may pivot upwards away from the conveyor 130 to position the flipper mesh 1205 above the top surface of the conveyor 130. In an embodiment, the pivotable connector 1240 may position the flipper mesh 1205 in line with the top surface of the conveyor 130 to flip flat items, such as envelopes, as shown in FIGS. 12a-12b, and may position the flipper mesh 1205 above the top surface of the conveyor 130 to flip three-dimensional items, such as boxes, as shown in FIGS. 12c-12d and FIGS. 13a-13c.

Figure 14A:
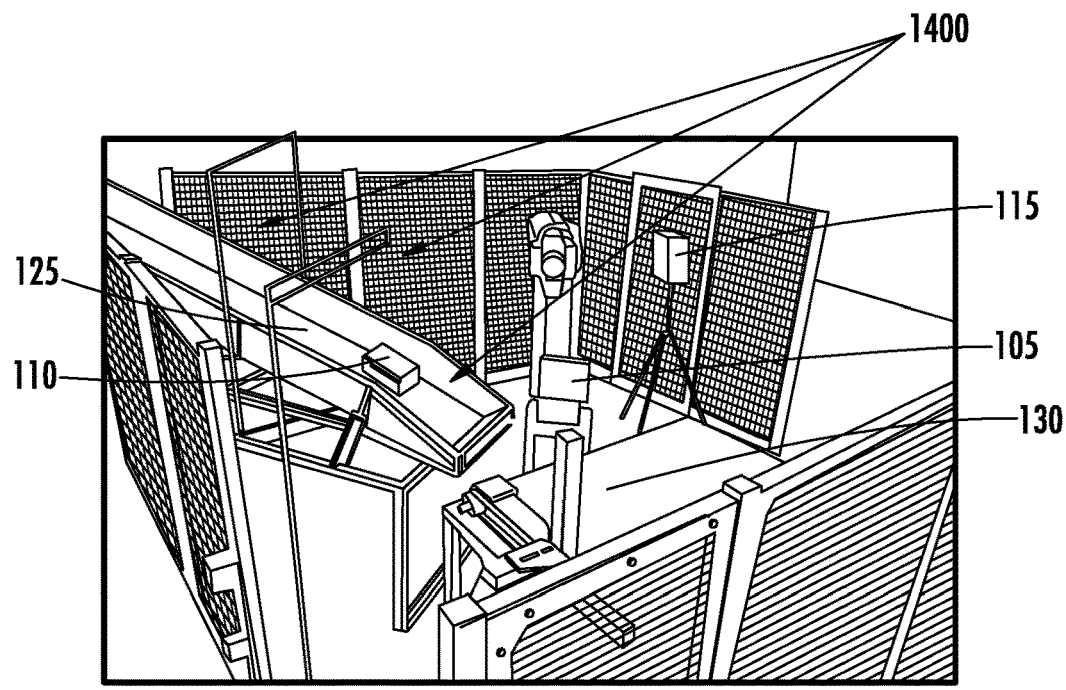
FIGS. 14a and 14b illustrate perspective views of a vision system of the material handling system, in accordance with one or more embodiments of the present disclosure.
Figure 14B:
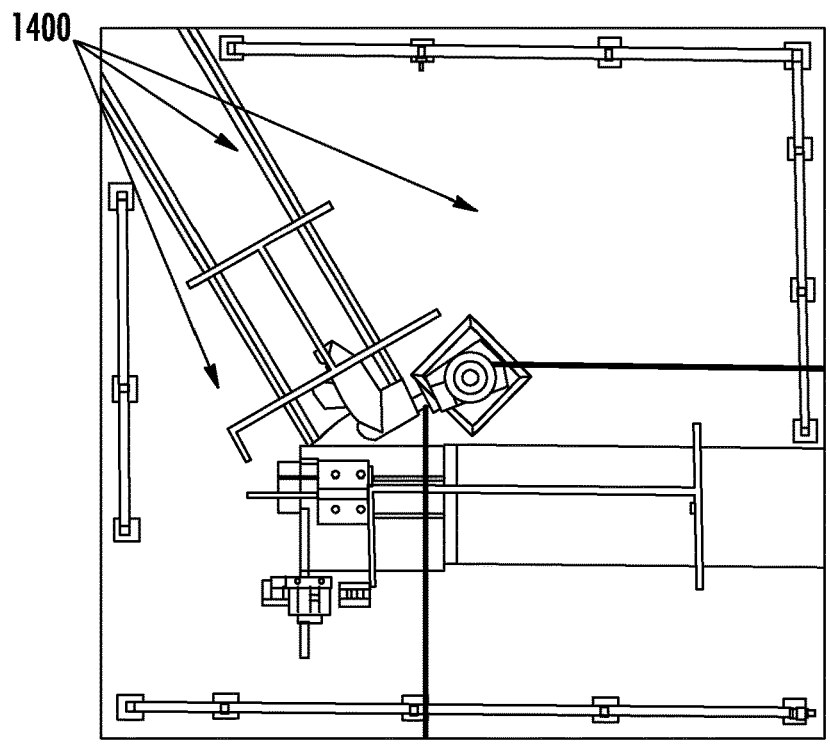

FIGS. 14a and 14b illustrate a vision and control subsystem of the material handling system 100, in accordance with one or more embodiments of the present disclosure. An identification of the item 110 and its orientation, (e.g., a label up orientation), may be performed by a sensing system comprising one or more sensors. For example, in some example embodiments, a vision system 1400 may include the one or more sensors including a camera and/or multiple cameras (not shown) installed around an area in a material handling environment having the item 110 which is be handled by the repositioning system 105. In this regard, in some example embodiments, the one or more cameras of the vision system 1400, may feed image data to the controller, and the controller may analyze the images at a high rate to identify a position of the item 110, an orientation of the item, and/or a label placed on the item 110. In addition, the cameras and/or the controller may also assess physical characteristics associated with the item, (e.g., a size, weight, and/or the like) of the item 110. The one or more sensors of the vision system 1400 may also include, e.g., a laser sensor, force sensor, torque sensor, and/or the like, to monitor such physical characteristics of the item 110. The vision system 1400 and/or the controller may also make an initial assessment of the physical characteristics of the item 110 to select an item handling procedure based on which the end effector 310 of the repositioning system 105, handles the item 110. For example, in some cases, the controller may perform the initial assessment to determine at least one of a type of the item 110, body shape of the item, orientation of the item 110, and/or the like. For instance, in some cases, the controller may determine the item 110 to be a bag, a box, a tote, a polybag, an envelope, and/or the like. The initial assessment may be performed based on colleting sensor and/or image data, before picking the item and/or at the time of picking the item 110, and further throughout an item handling process.

Further, the vision system 1400 and/or the controller may classify the item 110 based on utilizing machine learning classification. In this regard, the sensor data and/or the images collected by the controller may be used as a training set to generate a trainable model for automatically classifying the item 110 and selecting an item handling procedure for the end effector 310 based on the classification of the item 110. The selection of the item handling procedure can be done, prior to picking of the item 110 by the end effector 310. In some cases, in order to adjust a picking strategy and enabling the end effector 310 to react to pick the item 110 by using feedback from one or more sensors, such as, a force, torque, and/or vacuum sensor, to make real time assessment of how to best handle motions of one or more subsystems of the material handling system 100 to successfully handle the item 110. Further, labels and/or other identifiers associated with the item 110 may be scanned while the item 110 is picked and/or is in motion.

FIGS. 15-18 illustrates example flowcharts of operations performed by a material handling system for manipulating an item, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an item of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 15-18 when executed, convert a computer or processing circuitry into a particular machine configured to perform an example embodiment of the present invention. Accordingly, the operations of FIGS. 15-18 define an algorithm for configuring a computer or processor, to perform an example embodiment. In some cases, a general purpose computer may be provided with an instance of the processor which performs the algorithm of FIGS. 15-18 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

Figure 15:
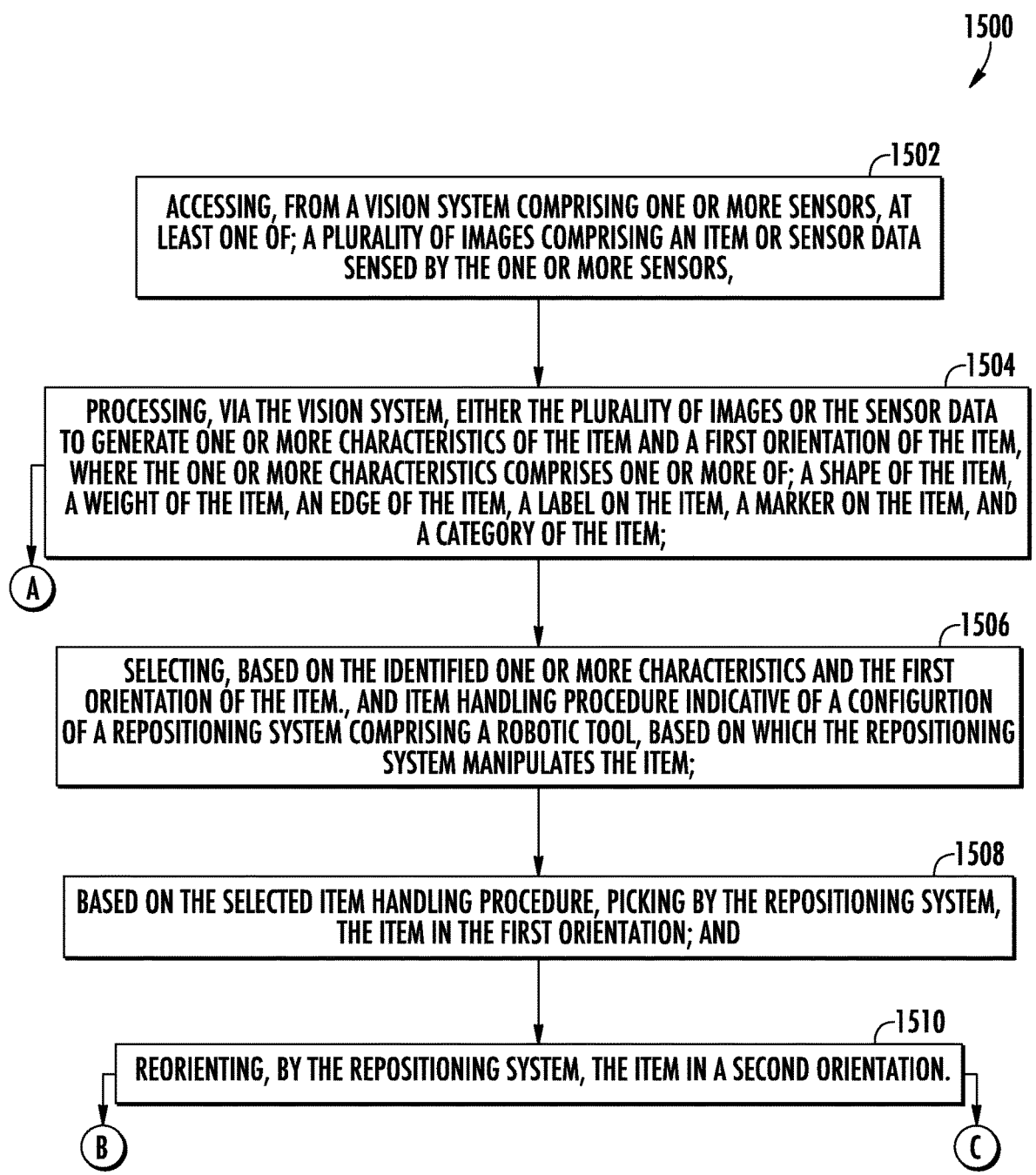
FIG. 15 illustrates a flow chart representing a method of manipulating an item by a material handling system, in accordance with various example embodiments described herein.

FIG. 15 illustrates a flowchart describing a method 1500 for manipulating an item, by the material handling system 100, from a first orientation to a second orientation in a material handling environment. According to some example embodiments, at step 1502, the material handling system 100 may include means such as, the vision system (115, 1400) and/or the end effector 310, comprising one or more sensors from which at least one of a plurality of images comprising the item 110 or sensor data sensed by the one or more sensors, may be accessed by the controller. In this regard, in some examples, the one or more sensors may include, a force sensor, a torque sensor, a distance sensor, photo diodes, barcode scanners, RFID readers, and/or the like.

At step 1504, the controller of the material handling system may, via the vision system (115, 1400) process, either the plurality of images or the sensor data, to generate one or more characteristics of the item and a first orientation of the item 110. In some examples, the one or more characteristics comprise at least one of physical characteristics of the item 110, for example, a size of the item 110, body shape of the item 110, texture of the item 110, features like, edges, blobs on body of the item 110, surfaces of the item 110, label of the item 110, orientation of the label of the item 110, location of the label of the item 110, type of the item 110, identifier on the label of the item 110, distance of the item 110 from the end effector 310, and/or the like.

Moving to step 1506, the controller of the material handling system 100 may select an item handling procedure indicative of a configuration of the robotic tool 300, based on which the end effector 310 of the repositioning system 105 manipulates the item. In this regard, the controller may select the item handling procedure based on the identified one or more characteristics and the first orientation of the item, at step 1504. It may be understood that procedures for handling different items by robotic tools in a material handling system may vary depending on different physical characteristics of respective items. For instance, depending on a product type, in an example, the end effector 310 may be configured to manipulate the item 110 based on a first item handling procedure for grasping an item which is a hard-sided box. Similarly, in another example, the end effector 310 may be configured to manipulate the item 110 based on a second item handling procedure for grasping the item which is a flexible and squishy polybag. In some cases, an item handling procedure for which the end effector 310 is pre-configured may be adjusted based on the identified one or more characteristics of the item 110.

Based on the selected item handling procedure, at step 1508, the material handling system 100 may include the repositioning system 105 comprising the robotic tool to pick, by the end effector 310, the item in the first orientation. In this regard, the item 110 may be picked based on engagement of the item 110 with the end effector 310 using any suitable configurations of the end effector 310, as described earlier, in various embodiments related to FIGS. 3a-14b.

At step 1510, the material handling system 100 may include means such as the end effector of the repositioning system 105 to reorient the item in a second orientation. In this regard, the item 110 may be reoriented based on any of: flipping of the item 110 or rotating of the item 110 etc., via any configuration of the end effector 310 as described earlier, in various embodiments related to FIGS. 3a-14b.

Figure 16:
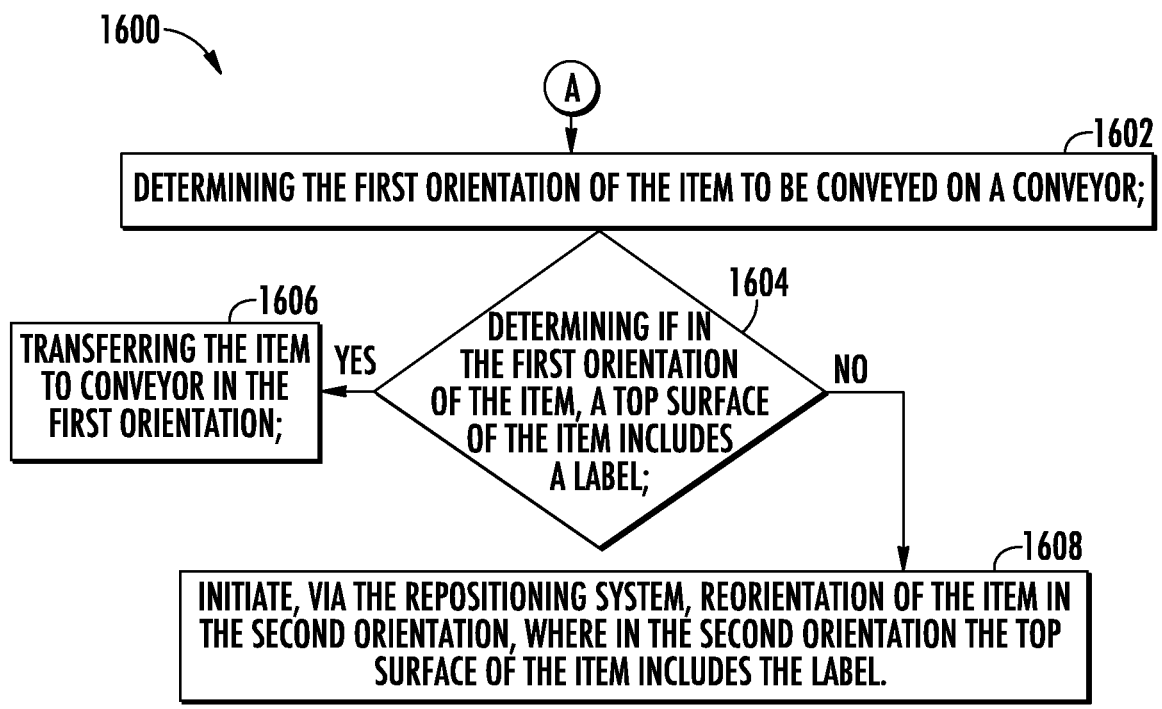
FIG. 16 illustrates a flowchart representing another method of manipulating an item by a material handling system, in accordance with various example embodiments described herein.

FIG. 16 illustrates another flowchart describing another method 1600 for manipulating an item from a first orientation to a second orientation in a material handling environment by the material handling system 100, as described in reference to FIG. 1. In this regard, in some cases, it is required to operate the end effector 310 so as to, pick an item from a first conveyor, reorient the item, and place the item to either the first conveyor or a second conveyor. In accordance with some example embodiments, upon generating the one or more characteristics of the item 110, as described at step 1504 of FIG. 15, at step 1602, the material handling system 100 may include means such as, the vision system (115, 1400) to determine the first orientation of the item 110 to be conveyed on a conveyor such as, the conveyor 130. In this regard, at step 1604, the vision system (115, 1400) may determine if in the first orientation of the item 110, a top surface of the item 110 includes a label. Here, the top surface of the item refers to a surface of the item which is exposed to a field of view of one or more sensors of the vision system (115, 1400). In response to determining that the top surface of the item 110 includes the label, the method moves to step 1606, where the controller of the material handling system 100, may transfer the item to the conveyor 130 in the first orientation.

Otherwise, at step 1604, in response to determining that the top surface of the item 110 does not include the label, the method moves to step 1608, where the controller of the material handling system 100, may initiate, via the repositioning system 105, reorientation of the item from the first orientation to the second orientation. Here, the second orientation the top surface of the item includes the label. To this extent, the reorientation of the item 110 may be performed using any configuration of the end effector 310 of the robotic tool 300 of the repositioning system 105, based on as described earlier, in various embodiments related to FIGS. 3a-14b. Thus, the controller of the material handling system 100 causes to manipulate the item 110, via the robotic tool 300, from the first orientation to the second orientation for cases, where the item 110 includes a label which is not positioned on a top surface exposed in a field of view of the vision system (115, 1400). Otherwise, the item 110 is conveyed as such, without any handling by the robotic tool 300 for reorienting the item 110.

Figure 17:
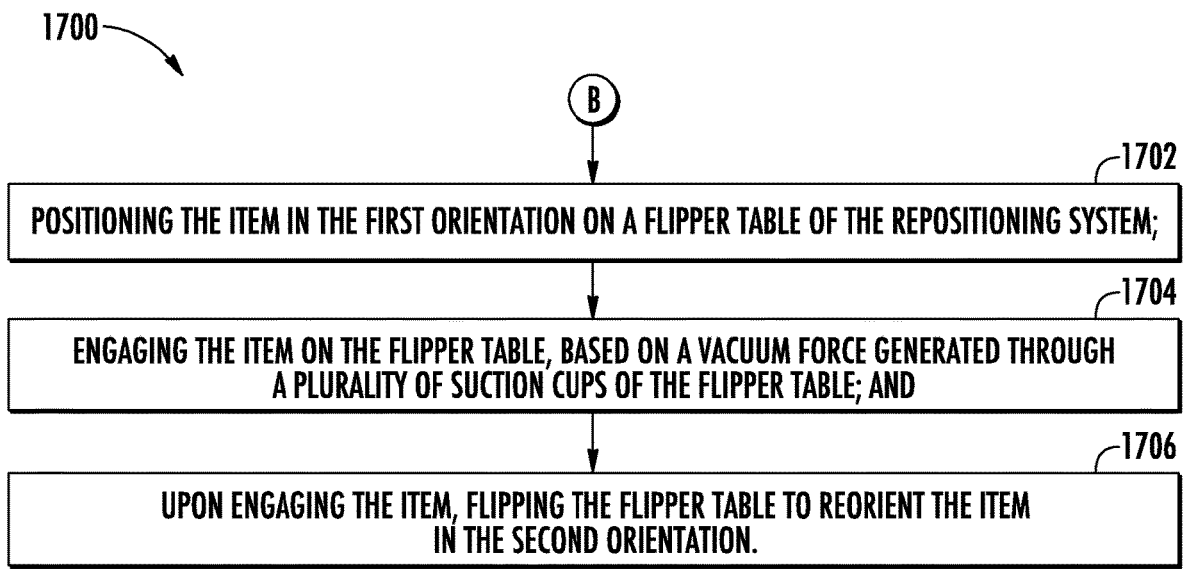
FIG. 17 illustrates a flowchart representing a method of reorienting the item from a first orientation to a second orientation, by an end effector comprising a flipper table, in accordance with various example embodiments described herein.

FIG. 17 illustrates a flowchart representing a method 1700 of repositioning the item from a first orientation to a second orientation, by an end effector comprising a flipper table such as, the flipper table 820, in accordance with various example embodiments described herein. In accordance with some example embodiments, upon picking the item 110 in the first orientation by the repositioning system 105, as described at step 1508 of FIG. 15. For reorienting the item in the second orientation, the method 1700, at step, 1702, includes positioning the item 110 in the first orientation on the flipper table 820 of the repositioning system 105. In this regard, positioning of the item 110 over the flipper table 820 may be performed based on the operations described earlier in reference to FIGS. 10a-10f and 11a-11b.

As described earlier, in reference to FIGS. 8, 9a-9b, the flipper table 820 includes one or more suction cups 905 disposed on a top and/or a bottom surface of the flipper table 820 to engage the item 110. In this regard, at step 1704, the method 1700 includes engaging, by the one or more suction cups 905 of the flipper table 820, the item 110 on the flipper table 820. The engagement of the item 110 with the flipper table 820 is based on a vacuum force generated through the one or more suction cups 905 of the flipper table 820.

Upon engagement of the item 110, the method 1700 includes, at step 1706, flipping the flipper table 820 to reorient the item 110 in the second orientation. In this regard, the controller of the material handling system 100 may actuate the end shaft 825 to rotate about its axis, thereby flipping the flipper table 820 along with the item 110 engaged to it, as described earlier in reference to FIGS. 8, 9a-9b, 10a-10f, and 11a-11b.

Figure 18:
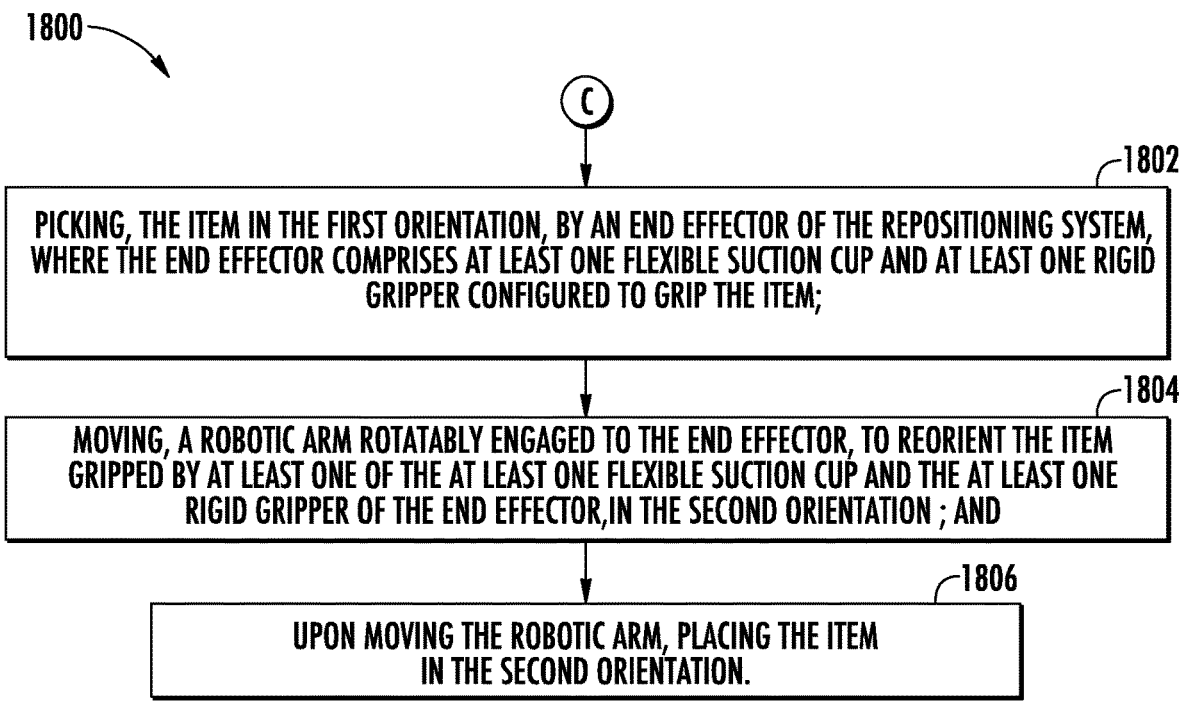
FIG. 18 illustrates a flowchart representing a method of reorienting the item from a first orientation to a second orientation, by another end effector, in accordance with some example embodiments described herein.

FIG. 18 illustrates another flowchart representing a method 1800 of repositioning the item 110 from a first orientation to a second orientation, by another end effector, in accordance with some example embodiments. In this regard, the end effector comprises the vacuum gripper 315 having the one or more flexible suction cups 320 and/or the one or more rigid gripper 325, as described earlier in reference to FIGS. 3a-3e.

In accordance with some example embodiments, upon picking the item 110 in the first orientation by the repositioning system 105, as described at step 1508 of FIG. 15. For reorienting the item in the second orientation, the method 1800, at step 1802 includes, picking, by the end effector of the repositioning system 105, the item 110 in the first orientation. In this regard, the controller may selectively actuate one or more of the flexible suction cups 320 and/or the one or more rigid gripper 325 of the end effector 310 to cause engage of the item 110 with the vacuum gripper 315. For instance, in an example case, if the item 110 is of a flexible body shape such as, but not limited to, an envelope, a poly bag, a paper bag package and/or the like, the controller may actuate the one or more flexible suction cups 320 to grip the item 110 by vacuum suction force generated through the one or more flexible suction cups 320. Accordingly, in another example case, if the item 110 is of a rigid body shape such as, but not limited to, a tote, a container, a heavy box, carton, and/or the like, the controller may actuate the one or more rigid gripper 325 to grip the item 110 by vacuum suction force generated through the rigid gripper 325.

The method further includes, at step 1804, moving, the robotic arm portion 305 rotatably engaged to the end effector 310, to reorient the item 110 gripped by at least one of the one or more flexible suction cups 320 and/or the one or more rigid gripper 325 of the end effector, in the second orientation. In this regard, the end effector 310 may be rotated to change the orientation of the item 110 engaged to the vacuum gripper 315.

Further, upon moving the robotic arm, the method 1800, at step 1806 includes, placing, by the end effector 310 of the repositioning system 105, the item 110 in the second orientation. In this regard, upon placement of the item 110, one or more ejectors of the end effector 310 may eject the item 110 engaged with the vacuum gripper 315.

It must be noted that, as used in this specification and the appended claims, the singular forms "a," "an" and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

EXAMPLE EMBODIMENTS

1A. A material handling system for handling both rigid and flexible items, the material handling system comprising:
a repositioning system comprising at least one of:
a robotic tool, wherein the robotic tool comprises: a robotic arm portion, and an end effector, coupled to the robotic arm portion, wherein the robotic tool is configured to pick one or more items in a first orientation and reorient the one or more items to a second orientation for placement onto a conveyor;
a flipper unit configured to receive an item in a first orientation and flip to place the item onto the conveyor in a second orientation; and
an orientation table comprising at least two conveyor strip belts, wherein each of the at least two conveyor strip belts is independently controlled to rotate an item placed on the orientation table in a first orientation to a second orientation;
a vision system, comprising one or more sensors positioned at one or more predetermined locations within the material handling system, the vision system configured to generate inputs corresponding to one or more characteristics of the items; and
a controller in communication with the repositioning system and the vision system, wherein the controller comprises at least one processor that executes instructions to cause the material handling system to perform operations comprising:
determining, by the vision system, a first orientation of an item to be conveyed on the conveyor;
receiving, by the repositioning system, the item in the first orientation; and
reorienting, by the repositioning system, the item in a second orientation for placement onto the conveyor.

2A. The material handling system of claim 1A, wherein the repositioning system comprises at least one of the robotic tool, the flipper unit, the orientable table, or a combination thereof.

3A. The material handling system of claim 1A, wherein the repositioning system receives the one or more items from one of a chute and a conveyor in a first orientation, wherein the one of the chute and the conveyor is configured to receive the one or more items from an upstream conveyor of the material handling system.

4A. The material handling system of claim 1A, wherein the conveyor is a section of the material handling system positioned downstream from the repositioning system.

5A. The material handling system of claim 4A, wherein the conveyor is an induction conveyor for a sortation system of the material handling system.

6A. The material handling system of claim 1A, wherein the orientation table is a part of or connected to the conveyor such that the one or more items are reoriented and transferred from the orientation table to the conveyor.

7A. The material handling system of claim 1A, wherein each of the at least two conveyor strip belts of the orientation table are controlled to operate at different speeds and direction.

8A. The material handling system of claim 1A, wherein the orientation table comprises a wide belt and a narrow belt, wherein the repositioning system places smaller items on the wide belt for conveying to a downstream conveyor.

9A. The material handling system of claim 1A, further comprising an identification system for scanning an identifier associated with the one or more items.

10A. The material handling system of claim 9A, wherein the identification system is a barcode scanning system, and the identifier is a barcode.

11A. The material handling system of claim 1A, wherein the repositioning system reorients the one or more items to a label-up position such that a label comprising an identifier associated with the one or more items is positioned on the top face of the one or more items for scanning.

12A. The material handling system of claim 1A, wherein the controller is further configured to:
determine a first orientation of an item to be conveyed on the conveyor;

determine if the top surface of the item includes at least one of a label, marker, or barcode in the first orientation of the item; and in response to determining that the top surface of the item includes the at least one of a label, marker, or barcode, transferring the item to the conveyor in the first orientation.

13A. The material handling system of claim 1A, wherein the end effector of the robotic tool includes a vacuum gripper, wherein the vacuum gripper includes one or more flexible suction cups and a rigid gripper.

14A. The material handling system of claim 13A, wherein each of the one or more flexible suction cups and the one or more rigid gripper comprises an ejector.

15A. The material handling system of claim 1A, wherein the end effector of the robotic tool includes a pinch gripper, wherein the pinch gripper comprising:
a mount attached to the robotic arm portion of the robotic tool; and
at least two plates attached to mount such that a proximal end of each of the at least two plates pivotally attached to the mount at a pivot point, and a distal end of each of the at least two plates is capable to rotating freely about the pivot point.

16A. The material handling system of claim 15A, wherein the at least two plates further comprising one or more suction cups attached to at least a bottom surface of the at least two plates.

17A. The material handling system of claim 16A, wherein the pinch gripper comprising at least a first plate and a second plate is configured to:
pick an item by grasping a first edge of the item with a first set of suction cups of the first plate;
rotate the first plate about the pivot point towards the second plate, such that a second edge of the item is grasped by a second set of suction cups of the second plate; and
release the first edge of the item from the first plate.

18A. The material handling system of claim 17A, wherein the pinch gripper is further configured to:
rotate the second plate towards the first plate to grasp the second edge of the item;
rotate the second plate about the pivot point to place at least one of the first edge or a third edge of the item on the conveyor; and
release the second edge of the item from the second plate.

19A. The material handling system of claim 1A, wherein the robotic tool further includes one or more sensors, wherein the one or more sensors include at least one of a force sensor, a torque sensor, and a distance sensor.

20A. The material handling system of claim 1A, wherein the end effector further comprising a roller gripper having at least two rollers disposed adjacent to each other, such that each of the two rollers rotate in opposite direction to pinch and hold at least a portion of the item between the two rollers, further wherein each of the two rollers rotate in same direction to release the portion of the item held between the two rollers.

21A. The material handling system of claim 1A, wherein the flipper unit includes a flipper mesh having a receiving platform such that one end of the receiving platform is pivotally attached to a shaft coupled to the conveyor and the other end of the receiving platform is configured to pivot to one or more positions between 0 and 360 degrees, wherein the flipper unit is configured to receive an item on the receiving platform in a first orientation and flip the receiving platform to place the item onto the conveyor in a second orientation 22A. The material handling system of claim 21A, wherein the receiving platform includes a plurality of elongated fingers positioned parallel to each other, wherein one end of each of the plurality of elongated fingers is attached to the shaft and the other end of each of the plurality of elongated fingers is rotatable about the shaft to one or more positions between 0 and 360 degrees.

23A. The material handling system of claim 22A, wherein the conveyor includes a plurality of strip belts, further wherein the plurality of elongated fingers rest between the plurality of strip belts below a surface of the conveyor such that the conveyor receives the item.

24A. The material handling system of claim 21A, wherein the shaft is coupled to the conveyor through a pivotable connector, wherein the pivotable connector is configured to pivot downwards towards the conveyor to position the flipper mesh at a first height, and the pivotable connector is configured to pivot upwards away from the conveyor to position the flipper mesh at a second height, further wherein the second height is greater than the first height.

25A. The material handling system of claim 1A, wherein the flipper unit comprises of:
at least two posts;
a second robot arm portion mounted between the posts, such that the second robot arm portion is capable of moving upwards and downwards along the posts, and outwards and inwards from the posts in a horizontal direction; and
a flipper table pivotally connected to a distal end of the second robot arm portion through an end shaft, wherein the flipper table is configured to receive an item in a first orientation and flip to place the item onto the conveyor in a second orientation.

26A. The material handling system of claim 25A, wherein the flipper table comprises of:
a top plate and a bottom plate connected through a central frame, wherein the central frame is connected to the end shaft; and
one or more suction cups disposed on the top plate and the bottom plate for holding the item.

27A. The material handling system of claim 25A, wherein the flipper unit further comprising:
one or more adjustable height supports disposed on the flipper table for supporting the item being flipped by the flipper unit; and
a drive motor communicatively coupled to the end shaft for rotating the end shaft.

28A. The material handling system of claim 25, wherein the flipper table is rotatable about the end shaft in a stowing position, wherein the top plate and the bottom plate of the flipper table is positioned proximal and parallel to the posts in the stowing position.

29A. The material handling system of claim 14A, wherein the ejector comprises compressed air fed into the flexible suction cups and the one or more rigid gripper.

What is claimed is:
1. A material handling system for manipulating items, the material handling system comprising:
a repositioning system comprising:
a robotic tool, wherein the robotic tool comprises:
a robotic arm portion, and
an end effector, coupled to the robotic arm portion, wherein the robotic tool is configured to manipu- late an item in a first orientation and reorient the item to a second orientation;

a vision system, comprising one or more sensors positioned within the material handling system, wherein the vision system is configured to generate inputs corresponding to one or more characteristics of the item; and a controller communicatively coupled to the repositioning system and the vision system, wherein the controller comprises at least one processor configured to execute instructions to cause the material handling system to:
identify, by the vision system, the item in the first orientation, including determining the first orientation of the item to be conveyed on a conveyor;
based on the one or more characteristics of the item generated by the vision system, initiate, by the repositioning system, repositioning of the item;
determine if in the first orientation of the item, a top surface of the item includes a label;
in response to determining that the top surface of the item includes the label, transfer the item to the conveyor in the first orientation; and
in response to determining that the top surface of the item does not include the label, initiate, via the repositioning system, reorientation of the item to the second orientation, wherein in the second orientation the top surface of the item includes the label and transferring the item to the conveyor in the second orientation.

2. The material handling system of claim 1, wherein the end effector of the robotic tool further comprises:
a flipper table adapted to flip the item from the first orientation to the second orientation; or
a vacuum gripper rotatably engaged to the robotic arm, wherein the vacuum gripper comprises at least one flexible suction cup and at least one rigid gripper cup adapted to grip the item and rotate about an axis to manipulate the item from the first orientation to the second orientation.

3. The material handling system of claim 1, wherein the controller is further configured to:
access, from the vision system, at least one of:
a plurality of images captured by at least a camera of the vision system, wherein the plurality of images comprise the item, or
sensor data collected from the one or more sensors;
process, via the vision system, either the plurality of images or the sensor data to generate the one or more characteristics of the item, wherein the one or more characteristics comprise one or more of: a shape of the item, a weight of the item, an edge of the item, a label on the item, a marker on the item, or a category of the item;
classify the item based on the one or more characteristics of the item; and
based on the classification, select, an item handling procedure indicative of a configuration of the repositioning system based on which the repositioning system manipulates the item.

4. The material handling system of claim 1, wherein the robotic tool further comprises one or more sensors, wherein the one or more sensors include at least one of a force sensor, a torque sensor, or a distance sensor.

5. The material handling system of claim 1, wherein the repositioning system is configured to receive the item from a chute or a conveyor in the first orientation, wherein the chute or the conveyor is configured to receive the item from an upstream conveyor of the material handling system.

6. The material handling system of claim 1, wherein the item is positioned in the first orientation on a conveyor, wherein the conveyor is:
a section of the material handling system positioned downstream from the repositioning system; or
an induction conveyor for a sortation system of the material handling system.

7. The material handling system of claim 1, wherein the end effector of the repositioning system is an orientation table comprising at least two conveyor strip belts, wherein each of the at least two conveyor strip belts are independently controlled to rotate the item placed on the orientation table in the first orientation to the second orientation.

8. The material handling system of claim 7, wherein the orientation table is communicably coupled to a conveyor such that the item is reoriented and transferred from the orientation table to the conveyor.

9. The material handling system of claim 7, wherein each of the at least two conveyor strip belts of the orientation table are controlled to operate at different speeds and direction.

10. The material handling system of claim 7, wherein the orientation table comprises a wide belt and a narrow belt, and wherein the repositioning system is configured to place smaller items on the wide belt for conveying to a downstream conveyor.

11. The material handling system of claim 1, wherein the end effector of the robotic tool includes a pinch gripper, wherein the pinch gripper comprises:
a mount attached to the robotic arm portion of the robotic tool;
at least two plates; and
one or more suction cups attached to at least a bottom surface of the at least two plates, wherein the at least two plates are attached to the mount such that a proximal end of each of the at least two plates are pivotally attached to the mount at a pivot point, and a distal end of each of the at least two plates is capable of rotating freely about the pivot point.

12. The material handling system of claim 11, wherein the pinch gripper comprises at least a first plate and a second plate and wherein the pinch gripper is configured to:
pick the item by grasping a first edge of the item with a first set of suction cups of the first plate;
rotate the first plate about the pivot point towards the second plate, such that a second edge of the item is grasped by a second set of suction cups of the second plate; and
release the first edge of the item from the first plate.

13. The material handling system of claim 12, wherein the pinch gripper is further configured to:
rotate the second plate towards the first plate to grasp the second edge of the item;
rotate the second plate about the pivot point to place at least one of the first edge or a third edge of the item on a conveyor; and
release the second edge of the item from the second plate.

14. A method of manipulating items in a material handling system, comprising:
accessing, from a vision system comprising one or more sensors, at least one of a plurality of images comprising an item or sensor data sensed by the one or more sensors;
processing, via the vision system, either the plurality of images or the sensor data to generate one or more characteristics of the item and a first orientation of the item wherein the one or more characteristics comprises one or more of: a shape of the item, a weight of the item, an edge of the item, a label on the item, or a category of the item;

selecting, based on the identified one or more characteristics and the first orientation of the item, an item handling procedure indicative of a configuration of a repositioning system comprising a robotic tool, based on which the repositioning system manipulates the item;

based on the selected item handling procedure, picking by the repositioning system, the item in the first orientation;

reorienting, by the repositioning system, the item to a second orientation determining if in the first orientation of the item, a top surface of the item includes a label;

in response to determining that the top surface of the item includes the label, transferring the item to the conveyor in the first orientation;

in response to determining that the top surface of the item does not include the label, initiating, via the repositioning system, reorientation of the item in the second orientation, wherein in the second orientation the top surface of the item includes the label; and transferring the item to the conveyor in the second orientation.

15. The method of claim 14, wherein the reorienting of the item in the second orientation comprises:

positioning the item in the first orientation on a flipper table of the repositioning system;

engaging the item on the flipper table, based on a vacuum force generated through a plurality of suction cups of the flipper table; and upon engaging the item, flipping the flipper table to reorient the item to the second orientation.

16. The method of claim 14, wherein the reorienting of the item in the second orientation further comprises:

picking, the item in the first orientation, by an end effector of the repositioning system, wherein the end effector comprises at least one flexible suction cup and at least one rigid gripper configured to grip the item;

moving, a robotic arm rotatably engaged to the end effector, to reorient the item gripped by at least one of the at least one flexible suction cup and the at least one rigid gripper of the end effector, in the second orientation; and upon moving the robotic arm, placing the item in the second orientation.

* * * * *